US010667075B2

(12) United States Patent
Kulavik et al.

(10) Patent No.: US 10,667,075 B2
(45) Date of Patent: *May 26, 2020

(54) METHOD AND SYSTEM FOR IN-GAME VISUALIZATION BASED ON AUDIO ANALYSIS

(71) Applicant: Voyetra Turtle Beach, Inc., Valhalla, NY (US)

(72) Inventors: Richard Kulavik, San Jose, CA (US); Shobha Devi Kuruba Buchannagari, San Jose, CA (US)

(73) Assignee: Voyetra Turtle Beach, Inc., Valhalla, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/150,615

(22) Filed: May 10, 2016

(65) Prior Publication Data

US 2016/0255455 A1 Sep. 1, 2016

Related U.S. Application Data

(63) Continuation of application No. 14/448,712, filed on Jul. 31, 2014, now Pat. No. 9,338,541.

(51) Int. Cl.
*H04R 25/00* (2006.01)
*H04S 7/00* (2006.01)
(Continued)

(52) U.S. Cl.
CPC ............... *H04S 7/40* (2013.01); *G06F 3/162* (2013.01); *G06F 3/165* (2013.01); *H04R 1/1041* (2013.01);
(Continued)

(58) Field of Classification Search
CPC ...... H04R 1/1041; H04R 1/1008; H04R 5/04; H04S 7/40; H04S 2400/11; G06F 3/162; G06F 3/165; G10L 25/51
See application file for complete search history.

(56) References Cited

U.S. PATENT DOCUMENTS 6,053,814 A 4/2000 Pchenitchnikov
6,614,912 B1 9/2003 Yamada et al.
(Continued)

FOREIGN PATENT DOCUMENTS

WO 2012/172480 A2 12/2012

OTHER PUBLICATIONS

Int'l Search Report and Written Opinion for PCT/US14/54060 dated Dec. 18, 2014.
(Continued)

*Primary Examiner* — Tuan D Nguyen
(74) *Attorney, Agent, or Firm* — McAndrews, Held & Malloy

(57) ABSTRACT

A game headset receives a plurality of channels of game and/or chat audio during game play, monitors the plurality of channels, and detect one or more sounds on the channels during the monitoring. The game headset determines characteristics of the detected one or more sound and outputs one or more signals for generating a visual representation of the detected one or more sounds based on the determined characteristics. The game headset output the signals to a game console that provides the game play. The game console displays the visual representation during the game play based on the communicated visualization information. The one or more signals is a video stream of an in-game visualization. The game headset outputs the one or more
(Continued)

signals to a second screen communication device that generates the visual representation during the game play based on the signals.

20 Claims, 13 Drawing Sheets

Related U.S. Application Data

(60) Provisional application No. 61/888,710, filed on Oct. 9, 2013.

(51) Int. Cl.
*H04R 1/10* (2006.01)
*G06F 3/16* (2006.01)
*H04R 5/033* (2006.01)
*H04R 5/04* (2006.01)
*G10L 25/51* (2013.01)

(52) U.S. Cl.
CPC .............. *H04R 5/033* (2013.01); *G10L 25/51* (2013.01); *H04R 1/1008* (2013.01); *H04R 5/04* (2013.01); *H04S 2400/11* (2013.01)

(56) References Cited

U.S. PATENT DOCUMENTS

| | | | |
|---|---|---|---|
| 7,136,712 B2 | 11/2006 | Mizumura et al. | |
| 7,976,385 B2 | 7/2011 | Riggs | |
| 8,841,535 B2* | 9/2014 | Collins | G06F 3/04817 |
| | | | 715/727 |
| 8,979,658 B1 | 3/2015 | Kulavik | |
| 9,067,135 B2 | 6/2015 | Kulavik | |
| 2002/0094865 A1 | 7/2002 | Araki et al. | |
| 2002/0161586 A1 | 10/2002 | Wang | |
| 2003/0007648 A1 | 1/2003 | Currell | |
| 2004/0136538 A1 | 7/2004 | Cohen et al. | |
| 2005/0117761 A1 | 6/2005 | Sato | |
| 2006/0120533 A1 | 6/2006 | Chen | |
| 2006/0251263 A1* | 11/2006 | Vronay | H04R 27/00 |
| | | | 381/17 |
| 2008/0009332 A1 | 1/2008 | Kake | |
| 2008/0240458 A1 | 10/2008 | Goldstein et al. | |
| 2008/0311997 A1* | 12/2008 | Goossen | A63F 13/10 |
| | | | 463/43 |
| 2008/0318518 A1 | 12/2008 | Coutinho et al. | |
| 2009/0005129 A1 | 1/2009 | McLoone et al. | |
| 2009/0147975 A1 | 6/2009 | Horbach et al. | |
| 2009/0232317 A1 | 9/2009 | Emerit et al. | |
| 2009/0252337 A1 | 10/2009 | Chen et al. | |
| 2009/0252344 A1 | 10/2009 | Mao et al. | |
| 2009/0252355 A1 | 10/2009 | Mao | |
| 2009/0304214 A1 | 12/2009 | Xiang et al. | |
| 2010/0040240 A1 | 2/2010 | Bonanno | |
| 2010/0245585 A1* | 9/2010 | Fisher | H04M 1/6066 |
| | | | 348/164 |
| 2011/0135098 A1 | 6/2011 | Kuhr et al. | |
| 2011/0212777 A1* | 9/2011 | Chen | A63F 13/235 |
| | | | 463/32 |
| 2011/0275432 A1* | 11/2011 | Lutnick | G07F 17/3232 |
| | | | 463/25 |
| 2012/0014553 A1 | 1/2012 | Bonanno | |
| 2012/0114132 A1 | 5/2012 | Abrahamsson et al. | |
| 2012/0213375 A1 | 8/2012 | Mahabub et al. | |
| 2013/0041648 A1 | 2/2013 | Osman | |
| 2013/0123019 A1* | 5/2013 | Sullivan | A63F 13/424 |
| | | | 3/424 |
| 2013/0259256 A1* | 10/2013 | Shen | H04R 3/00 |
| | | | 381/74 |
| 2014/0073429 A1 | 3/2014 | Meneses et al. | |
| 2014/0133683 A1 | 5/2014 | Robinson et al. | |
| 2015/0098575 A1 | 4/2015 | Kulavik et al. | |
| 2015/0098597 A1 | 4/2015 | Kulavik | |
| 2016/0142830 A1* | 5/2016 | Hu | G02C 11/06 |
| | | | 434/185 |

OTHER PUBLICATIONS

Int'l Search Report and Written Opinion for PCT/US2014/059691 dated Jan. 7, 2015.

Int'l Search Report and Written Opinion for PCT/US2014/049687 dated Nov. 18, 2014.

* cited by examiner

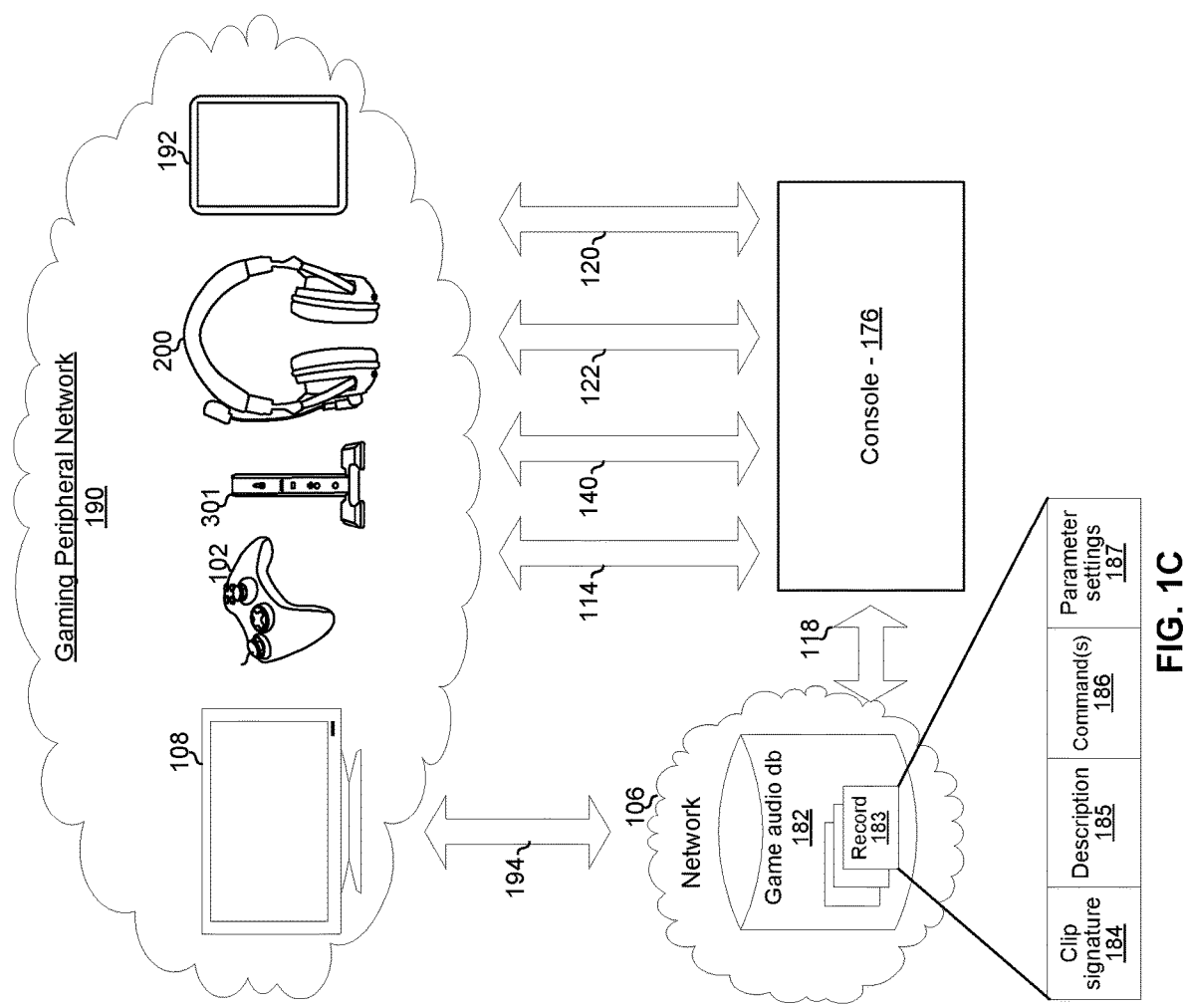

METHOD AND SYSTEM FOR IN-GAME VISUALIZATION BASED ON AUDIO ANALYSIS

PRIORITY CLAIM

This application is a continuation of U.S. patent application Ser. No. 14/448,712 filed Jul. 31, 2014 (now U.S. Pat. No. 9,338,541), which claims the benefit of priority to U.S. provisional patent application 61/888,710 titled "Method and System for In-Game Visualization Based on Audio Analysis," which is hereby incorporated herein by reference.

TECHNICAL FIELD

Aspects of the present application relate to electronic gaming. More specifically, to methods and systems for in-game visualization based on audio analysis.

BACKGROUND

Limitations and disadvantages of conventional approaches to audio processing for gaming will become apparent to one of skill in the art, through comparison of such approaches with some aspects of the present method and system set forth in the remainder of this disclosure with reference to the drawings.

BRIEF SUMMARY

Methods and systems are provided for in-game visualization based on audio analysis, substantially as illustrated by and/or described in connection with at least one of the figures, as set forth more completely in the claims.

BRIEF DESCRIPTION OF THE DRAWINGS

FIG. 1C is a diagram of an exemplary gaming console and an associated network of peripheral devices, in accordance with various exemplary embodiments of the disclosure.

DETAILED DESCRIPTION

Certain embodiments of the disclosure may be found in a method and system for in-game visualization based on audio analysis. In various embodiments of the invention, a game headset receives a plurality of channels of game and/or chat audio during game play. The game headset monitors the plurality of channels, and detects one or more sounds on the channels during the monitoring. The game headset determines characteristics of the detected one or more sound and outputs one or more signals for generating a visual representation of the detected one or more sounds based on the determined characteristics. The game headset outputs the signals to a game console that provides the game play. The game console displays the visual representation during the game play based on the communicated visualization information. The one or more signals may comprise a video stream of an in-game visualization. The game headset outputs the one or more signals to a second screen communication device that generates the visual representation during the game play based on the signals. The determining of the characteristics of the detected one or more sounds may comprise determining one or more of: changes in which of the plurality of channels are carrying the detected one or more sounds, changes in intensity or loudness of the detected one or more sound, and changes in frequency of occurrence of the detected one or more sounds. The characteristics may comprise one or more of: intensity or loudness of the detected one or more sounds, which of the plurality of channels are carrying the detected one or more sounds, and frequency of occurrence of the detected one or more sounds. The game headset may perform signal analysis on the plurality of channels of game and/or chat audio during the game play in order to determine the characteristics of the one or more sounds. The visual representation of the detected one or more sounds comprises a graphical representation of a location of the detected one or more sounds, and a graphical representation of one or more of the determined characteristics of the detected one or more sounds. The graphical representation of one or more of the determined characteristics of the detected one or more sounds comprises one or more of: a static representation, an animated representation and a dynamic representation.

Figure 1A:
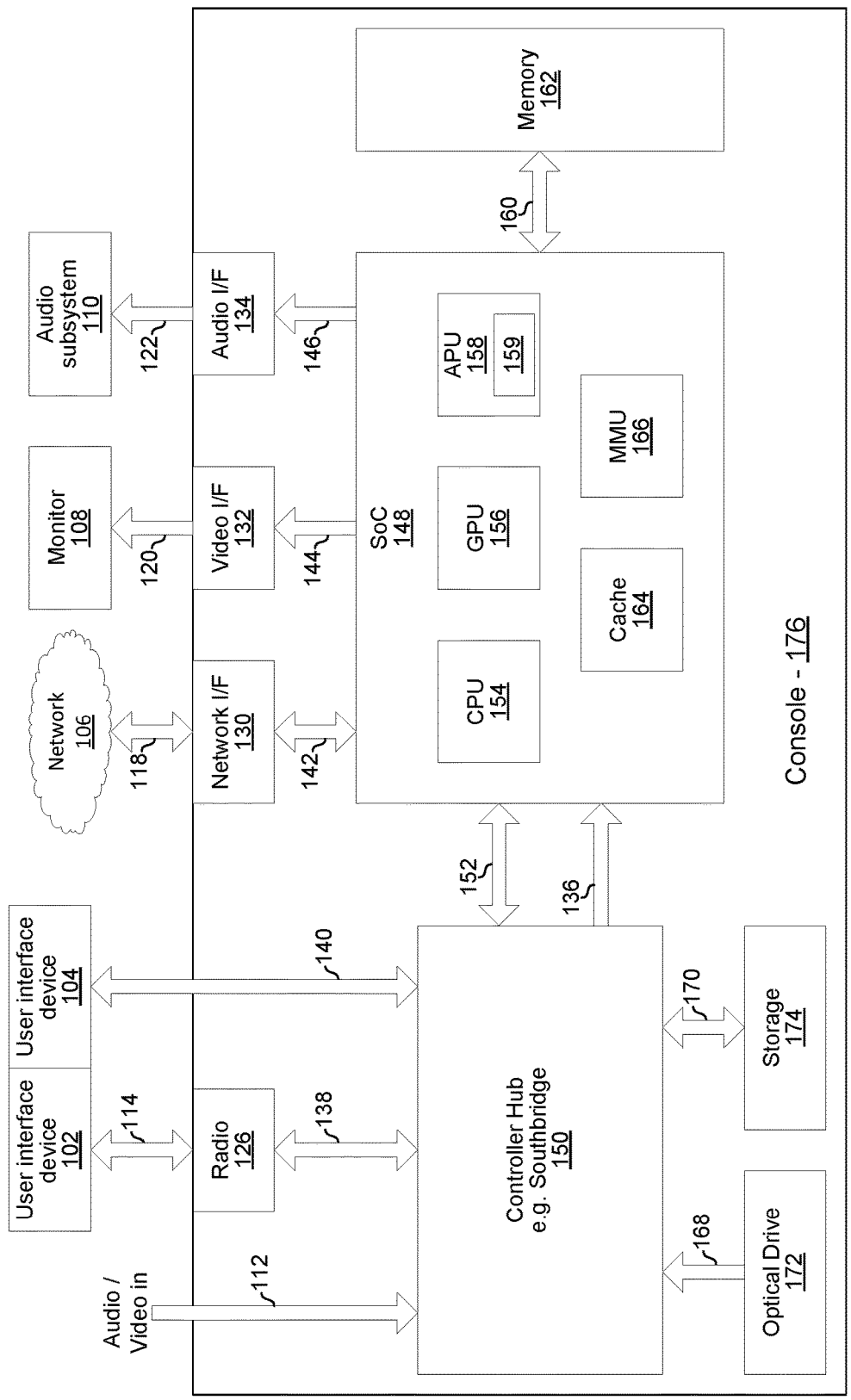
FIG. 1A is a diagram that depicts an example gaming console, which may be utilized to communicate with a headset that generates an in-game visualization based on audio analysis, in accordance with various exemplary embodiments of the disclosure.

FIG. 1A depicts an example gaming console, which may be utilized to communicate with a game headset that generates an in-game visualization based on audio analysis, in accordance with various exemplary embodiments of the disclosure. Referring to FIG. 1, there is shown a console 176, user interface devices 102, 104, a monitor 108, an audio subsystem 110, and a network 106.

The game console 176 may comprise suitable logic, circuitry, interfaces and/or code that may be operable to present a game to, and also enable game play interaction between, one or more local players and/or one or more remote players. The game console 176 which may be, for example, a Windows computing device, a Unix computing device, a Linux computing device, an Apple OSX computing device, an Apple iOS computing device, an Android computing device, a Microsoft Xbox, a Sony Playstation, a Nintendo Wii, or the like. The example game console 176 comprises a radio 126, network interface 130, video interface 132, audio interface 134, controller hub 150, main system on chip (SoC) 148, memory 162, optical drive 172, and storage device 174. The SoC 148 comprises central processing unit (CPU) 154, graphics processing unit (GPU) 156, audio processing unit (APU) 158, cache memory 164, and memory management unit (MMU) 166. The various components of the game console 176 are communicatively coupled through various buses/links 136, 138, 142, 144, 146, 152, 160, 168, and 170.

The controller hub 150 comprises circuitry that supports one or more data bus protocols such as High-Definition Multimedia Interface (HDMI), Universal Serial Bus (USB), Serial Advanced Technology Attachment II, III or variants thereof (SATA II, SATA III), embedded multimedia card interface (e.MMC), Peripheral Component Interconnect Express (PCIe), or the like. The controller hub 150 may also be referred to as an input/output (I/O) controller hub. Exemplary controller hubs may comprise Southbridge, Haswell, Fusion and Sandybridge. The controller hub 150 may be operable to receive audio and/or video from an external source via link 112 (e.g., HDMI), from the optical drive (e.g., Blu-Ray) 172 via link 168 (e.g., SATA II, SATA III), and/or from storage 174 (e.g., hard drive, FLASH memory, or the like) via link 170 (e.g., SATA II, III and/or e.MMC). Digital audio and/or video is output to the SoC 148 via link 136 (e.g., CEA-861-E compliant video and IEC 61937 compliant audio). The controller hub 150 exchanges data with the radio 126 via link 138 (e.g., USB), with external devices via link 140 (e.g., USB), with the storage 174 via the link 170, and with the SoC 148 via the link 152 (e.g., PCIe).

The radio 126 may comprise suitable logic, circuitry, interfaces and/or code that may be operable to communicate in accordance with one or more wireless standards such as the IEEE 802.11 family of standards, the Bluetooth family of standards, near field communication (NFC), and/or the like.

The network interface 130 may comprise suitable logic, circuitry, interfaces and/or code that may be operable to communicate in accordance with one or more wired standards and to convert between wired standards. For example, the network interface 130 may communicate with the SoC 148 via link 142 using a first standard (e.g., PCIe) and may communicate with the network 106 using a second standard (e.g., gigabit Ethernet).

The video interface 132 may comprise suitable logic, circuitry, interfaces and/or code that may be operable to communicate video in accordance with one or more wired or wireless video transmission standards. For example, the video interface 132 may receive CEA-861-E compliant video data via link 144 and encapsulate/format, etc., the video data in accordance with an HDMI standard for output to the monitor 108 via an HDMI link 120.

The audio interface 134 may comprise suitable logic, circuitry, interfaces and/or code that may be operable to communicate audio in accordance with one or more wired or wireless audio transmission standards. For example, the audio interface 134 may receive CEA-861-E compliant audio data via the link 146 and encapsulate/format, etc. the video data in accordance with an HDMI standard for output to the audio subsystem 110 via an HDMI link 122.

The central processing unit (CPU) 154 may comprise suitable logic, circuitry, interfaces and/or code that may be operable to execute instructions for controlling/coordinating the overall operation of the game console 176. Such instructions may be part of an operating system of the console and/or part of one or more software applications running on the console.

The graphics processing unit (GPU) 156 may comprise suitable logic, circuitry, interfaces and/or code that may be operable to perform graphics processing functions such as compression, decompression, encoding, decoding, 3D rendering, and/or the like.

The audio processing unit (APU) 158 may comprise suitable logic, circuitry, interfaces and/or code that may be operable to perform audio processing functions such as volume/gain control, compression, decompression, encoding, decoding, surround-sound processing, and/or the like to output single channel or multi-channel (e.g., 2 channels for stereo or 5, 7, or more channels for surround sound) audio signals. The APU 158 comprises memory (e.g., volatile and/or non-volatile memory) 159 which stores parameter settings to affect processing of audio by the APU 158. For example, the parameter settings may include a first audio gain/volume setting that determines, at least in part, a volume of game audio output by the console 176 and a second audio gain/volume setting that determines, at least in part, a volume of chat audio output by the console 176. The parameter settings may be modified via a graphical user interface (GUI) of the console and/or via an application programming interface (API) provided by the console 176.

The cache memory 164 may comprise suitable logic, circuitry, interfaces and/or code that may provide high-speed memory functions for use by the CPU 154, GPU 156, and/or APU 158. The cache memory 164 may typically comprise DRAM or variants thereof. The memory 162 may comprise additional memory for use by the CPU 154, GPU 156, and/or APU 158. The memory 162, typically DRAM, may operate at a slower speed than the cache memory 164 but may also be less expensive than cache memory as well as operate at a higher speed than the memory of the storage device 174. The MMU 166 controls accesses by the CPU 154, GPU 156, and/or APU 158 to the memory 162, the cache 164, and/or the storage device 174.

In FIG. 1A, the example game console 176 is communicatively coupled to the user interface device 102, the user interface device 104, the network 106, the monitor 108, and the audio subsystem 110.

Each of the user interface devices 102 and 104 may comprise, for example, a game controller, a keyboard, a motion sensor/position tracker, or the like. The user interface device 102 communicates with the game console 176 wirelessly via link 114 (e.g., Wi-Fi Direct, Bluetooth, NFC and/or the like). The user interface device 102 may be operable to communicate with the game console 176 via the wired link 140 (e.g., USB or the like).

The network 106 comprises a local area network and/or a wide area network. The game console 176 communicates with the network 106 via wired link 118 (e.g., Gigabit Ethernet).

The monitor 108 may be, for example, a LCD, OLED, or PLASMA screen. The game console 176 sends video to the monitor 108 via link 120 (e.g., HDMI).

The audio subsystem 110 may be, for example, a headset, a combination of headset and audio basestation, or a set of speakers and accompanying audio processing circuit. The game console 176 sends audio to the audio subsystem 110 via link(s) 122 (e.g., S/PDIF for digital audio or "line out" for analog audio). Additional details of an example audio subsystem 110 are described below.

Figure 1B:
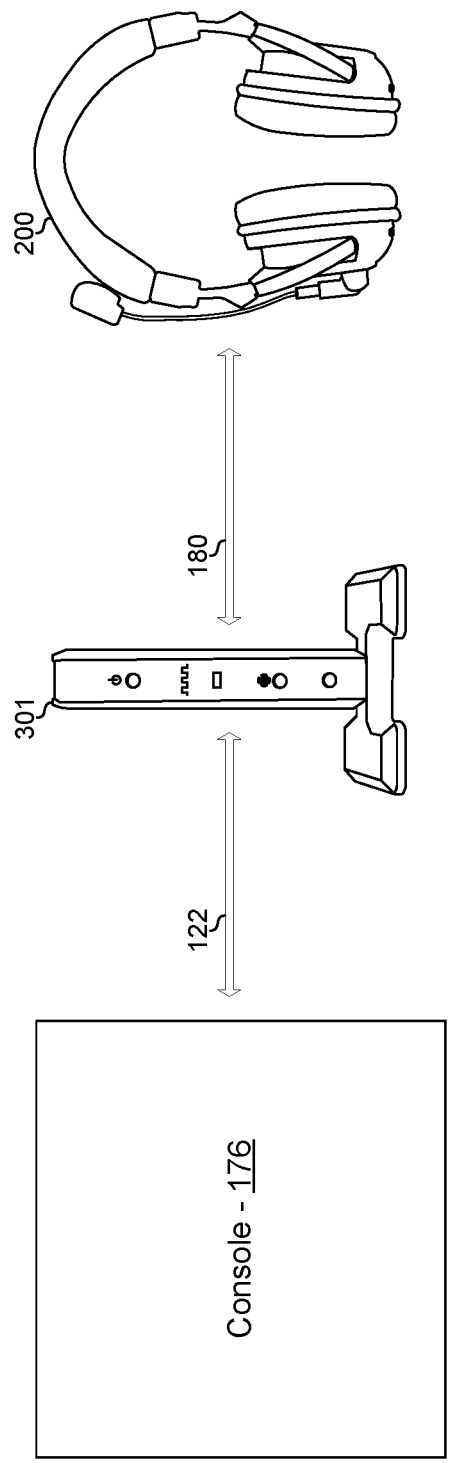
FIG. 1B is a diagram that depicts an example gaming audio subsystem comprising a headset and an audio basestation, in accordance with various exemplary embodiments of the disclosure.

FIG. 1B is a diagram that depicts an example gaming audio subsystem comprising a headset and an audio basestation, in accordance with various exemplary embodiments of the disclosure. Referring to FIG. 1B, there is shown a console 176, a headset 200 and an audio basestation 301. The headset 200 communicates with the basestation 301 via a link 180 and the basestation 301 communicates with the console 176 via a link 122. The link 122 may be as described above. In an example implementation, the link 180 may be a proprietary wireless link operating in an unlicensed frequency band. The headset 200 may be as described below with reference to FIGS. 2A-2C. The basestation 301 may be as described below with reference to FIGS. 3A-3B.

FIG. 1C is a diagram of an exemplary gaming console and an associated network of peripheral devices, in accordance with various exemplary embodiments of the disclosure. Referring to FIG. 1C, there is shown is the console 176, which is communicatively coupled to a plurality of peripheral devices and a network 106. The example peripheral devices shown include a monitor 108, a user interface device 102, a headset 200, an audio basestation 301, and a multi-purpose device 192.

The monitor 108 and the user interface device 102 are as described above. The headset 200 is as described below with reference to FIGS. 2A-2C. The audio basestation is as described below with reference to, for example, FIGS. 3A-3B.

The multi-purpose device 192 may comprise, for example, a tablet computer, a smartphone, a laptop computer, or the like and that runs an operating system such as Android, Linux, Windows, iOS, OSX, or the like. An example multi-purpose device is described below with reference to FIG. 4. Hardware (e.g., a network adaptor) and software (i.e., the operating system and one or more applications loaded onto the device 192) may configure the device 192 for operating as part of the GPN 190. For example, an application running on the device 192 may cause display of a graphical user interface (GUI), which may enable a user to access gaming-related data, commands, functions, parameter settings, and so on. The graphical user interface may enable a user to interact with the console 176 and the other devices of the GPN 190 to enhance the user's gaming experience.

The peripheral devices 102, 108, 192, 200, 301 are in communication with one another via a plurality of wired and/or wireless links (represented visually by the placement of the devices in the cloud of GPN 190). Each of the peripheral devices in the gaming peripheral network (GPN) 190 may communicate with one or more others of the peripheral devices in the GPN 190 in a single-hop or multi-hop fashion. For example, the headset 200 may communicate with the basestation 301 in a single hop (e.g., over a proprietary RF link) and with the device 192 in a single hop (e.g., over a Bluetooth or Wi-Fi direct link), while the tablet may communicate with the basestation 301 in two hops via the headset 200. As another example, the user interface device 102 may communicate with the headset 200 in a single hop (e.g., over a Bluetooth or Wi-Fi direct link) and with the device 192 in a single hop (e.g., over a Bluetooth or Wi-Fi direct link), while the device 192 may communicate with the headset 200 in two hops via the user interface device 102. These example interconnections among the peripheral devices of the GPN 190 are merely examples, any number and/or types of links and/or hops among the devices of the GPN 190 is possible.

The GPN 190 may communicate with the console 176 via any one or more of the connections 114, 140, 122, and 120 described above. The GPN 190 may communicate with a network 106 via one or more links 194 each of which may be, for example, Wi-Fi, wired Ethernet, and/or the like.

A database 182 which stores gaming audio data is accessible via the network 106. The gaming audio data may comprise, for example, signatures of particular audio clips (e.g., individual sounds or collections or sequences of sounds) that are part of the game audio of particular games, of particular levels/scenarios of particular games, particular characters of particular games, etc. In an example implementation, the database 182 may comprise a plurality of records 183, where each record 183 comprises an audio clip (or signature of the clip) 184, a description of the clip 185 (e.g., the game it is from, when it occurs in the game, etc.), one or more gaming commands 186 associated with the clip, one or more parameter settings 187 associated with the clip, and/or other data associated with the audio clip. Records 183 of the database 182 may be downloadable to, or accessed in real-time by, one of more devices of the GPN 190.

Figure 2A:
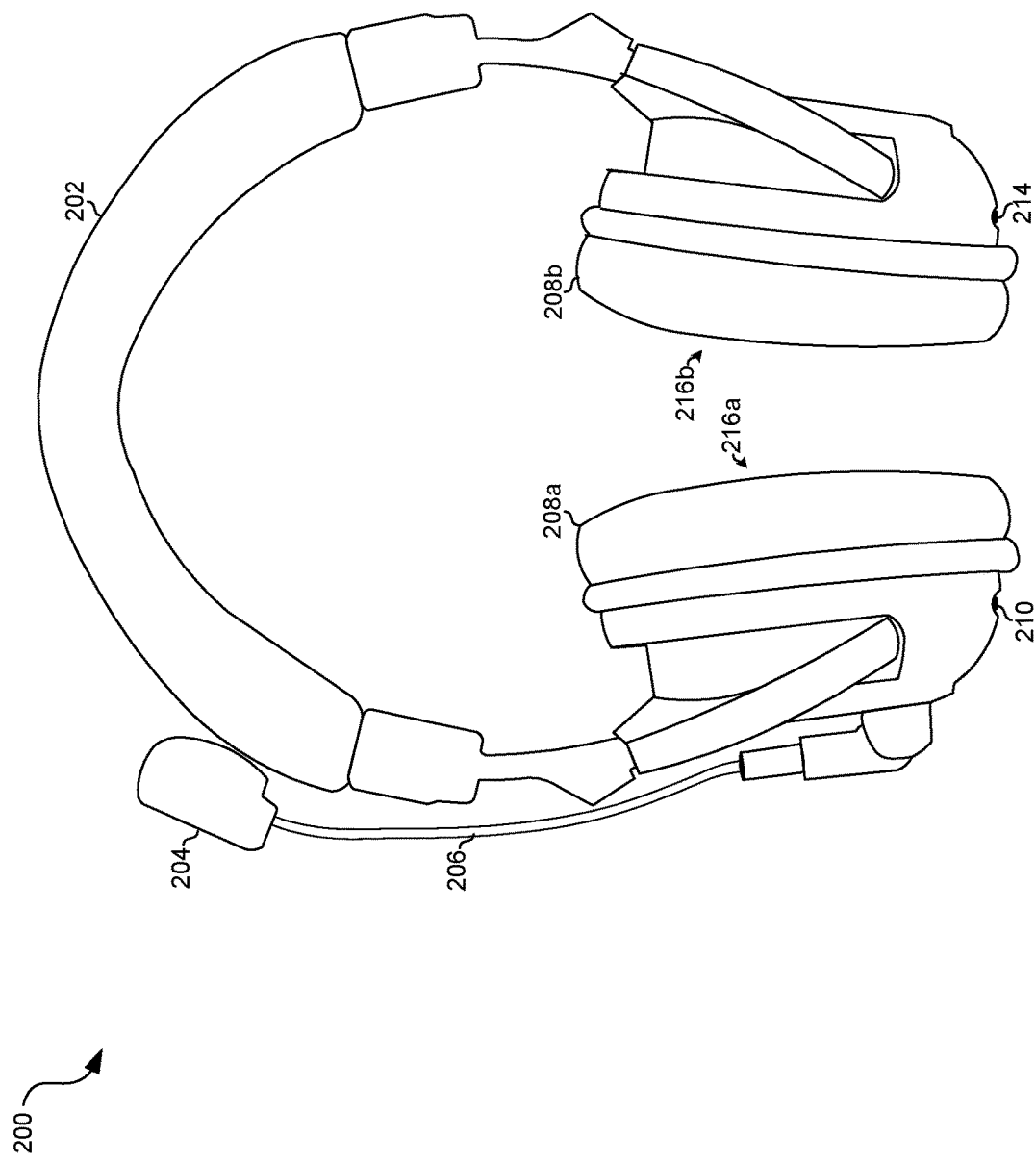
FIGS. 2A and 2B are diagrams that depict two views of an example embodiment of a game headset, in accordance with various exemplary embodiments of the disclosure.
Figure 2B:
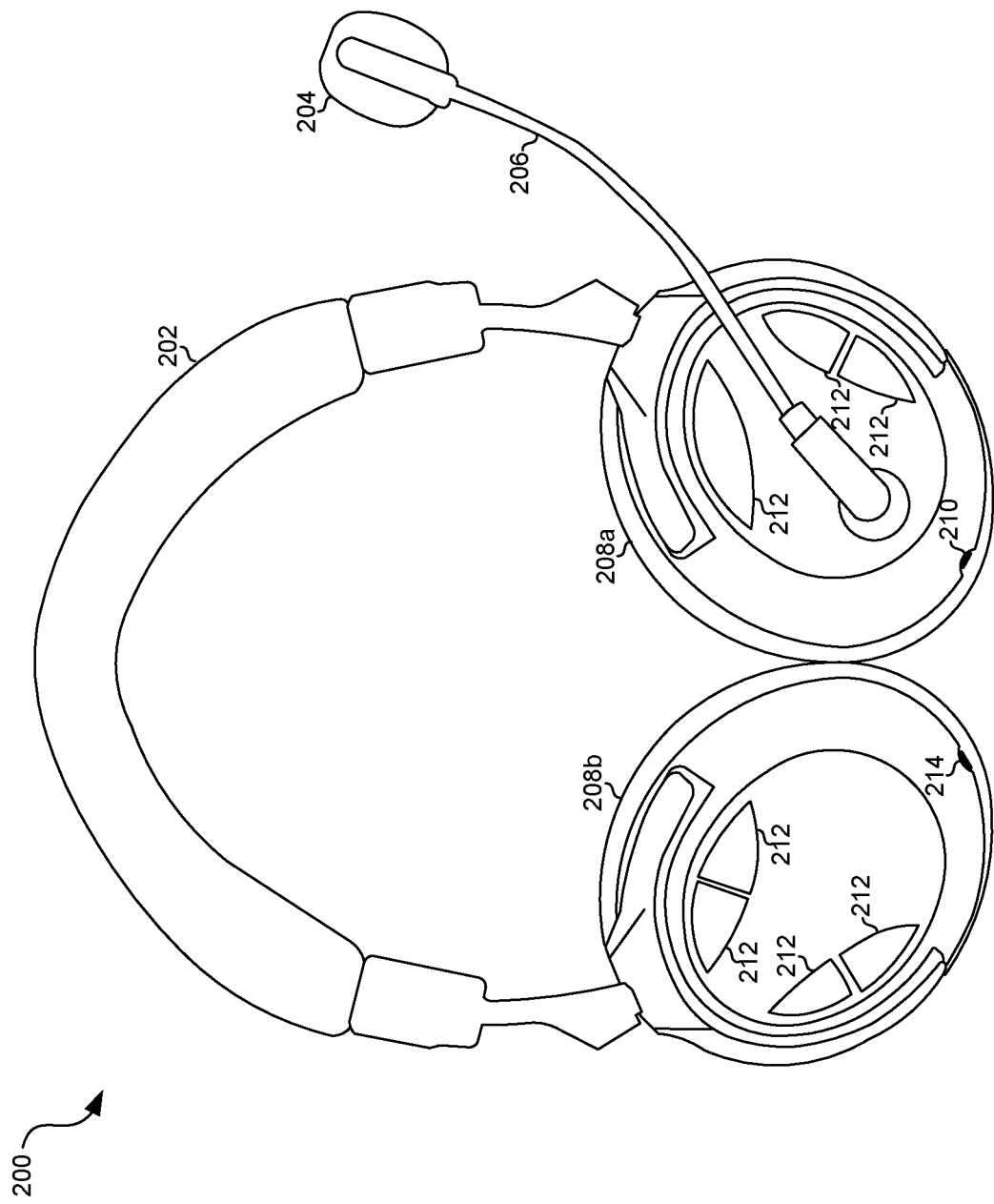

FIGS. 2A and 2B are diagrams that depict two views of an example embodiment of a game headset, in accordance with various exemplary embodiments of the disclosure. Referring to FIGS. 2A and 2B, there are shown two views of an example headset 200 that may present audio output by a gaming console such as the console 176. The headset 200 comprises a headband 202, a microphone boom 206 with microphone 204, ear cups 208a and 208b which surround speakers 216a and 216b, connector 210, connector 214, and user controls 212.

The connector 210 may be, for example, a 3.5 mm headphone socket for receiving analog audio signals (e.g., receiving chat audio via an Xbox "talkback" cable).

The microphone 204 may comprise suitable logic, circuitry, interfaces and/or code that may be operable to convert acoustic waves (e.g., the voice of the person wearing the headset) to electric signals for processing by circuitry of the headset and/or for output to a device (e.g., console 176, basestation 301, a smartphone, and/or the like) that is in communication with the headset.

The speakers 216a and 216b may comprise circuitry that may be operable to convert electrical signals to sound waves.

The user controls 212 may comprise dedicated and/or programmable buttons, switches, sliders, wheels, etc. for performing various functions. Example functions which the controls 212 may be configured to perform include: power the headset 200 on/off, mute/unmute the microphone 204, control gain/volume of, and/or effects applied to, chat audio by the audio processing circuit of the headset 200, control gain/volume of, and/or effects applied to, game audio by the audio processing circuit of the headset 200, enable/disable/ initiate pairing (e.g., via Bluetooth, Wi-Fi direct, NFC, or the like) with another computing device, and/or the like. Some of the user controls 212 may adaptively and/or dynamically change during gameplay based on a particular game that is being played. Some of the user controls 212 may also adaptively and/or dynamically change during gameplay based on a particular player that is engaged in the game play. The connector 214 may be, for example, a USB, thunderbolt, Firewire or other type of port or interface. The connector 214 may be used for downloading data to the headset 200 from another computing device and/or uploading data from the headset 200 to another computing device. Such data may include, for example, parameter settings (described below). Additionally, or alternatively, the connector 214 may be used for communicating with another computing device such as a smartphone, tablet compute, laptop computer, or the like.

Figure 2C:
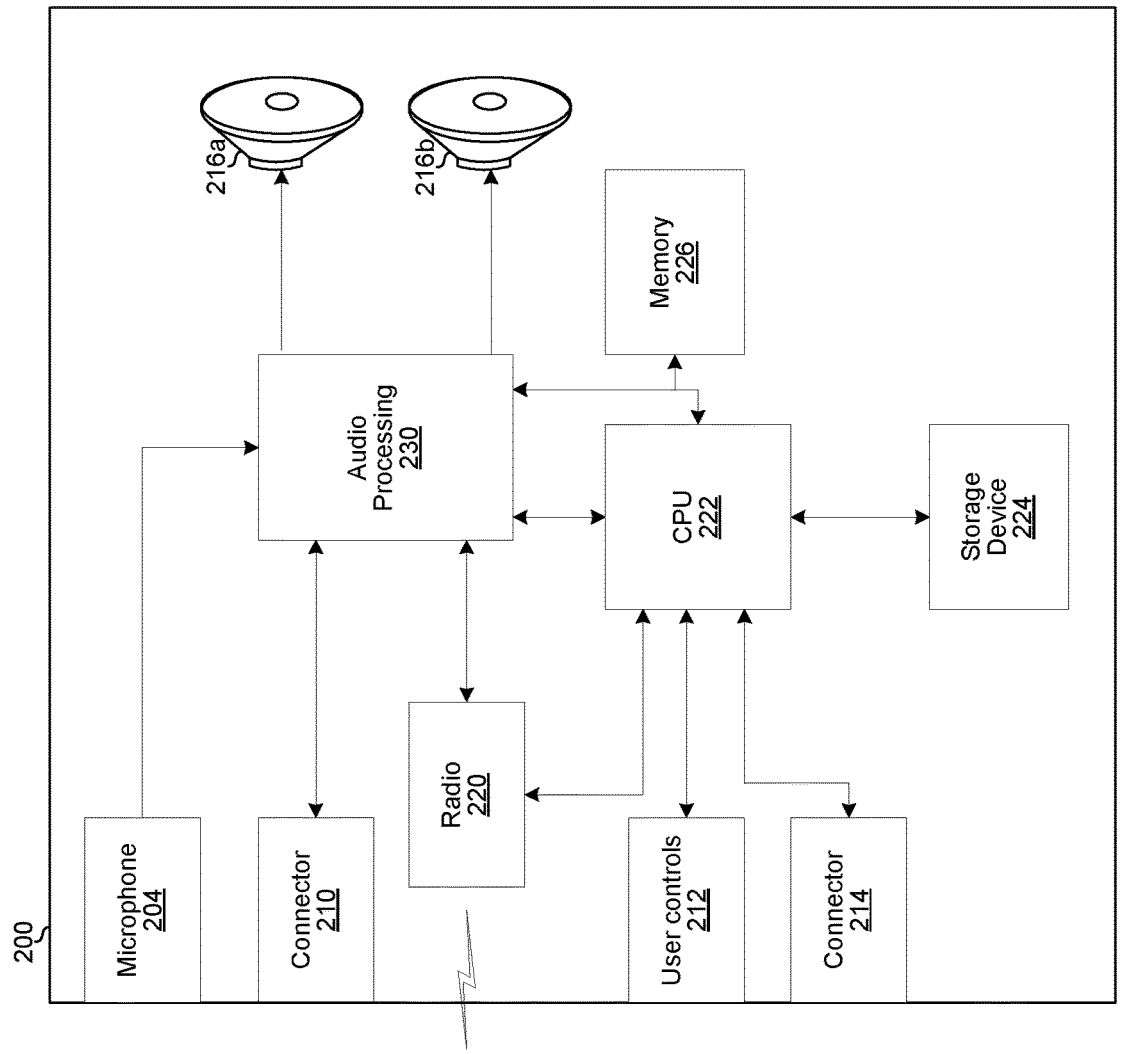
FIG. 2C is a diagram that depicts a block diagram of the example headset of FIGS. 2A and 2B, in accordance with various exemplary embodiments of the disclosure.

FIG. 2C is a diagram that depicts a block diagram of the example headset of FIGS. 2A and 2B, in accordance with various exemplary embodiments of the disclosure. Referring to FIG. 2C, there is shown a headset 200. In addition to the connector 210, user controls 212, connector 214, microphone 204, and speakers 216a and 216b already discussed, shown are a radio 220, a CPU 222, a storage device 224, a memory 226, and an audio processing circuit 230.

The radio 220 may comprise suitable logic, circuitry, interfaces and/or code that may be operable to communicate in accordance with one or more standardized (such as, for example, the IEEE 802.11 family of standards, NFC, the Bluetooth family of standards, and/or the like) and/or proprietary wireless protocol(s) (e.g., a proprietary protocol for receiving audio from an audio basestation such as the basestation 301).

The CPU 222 may comprise suitable logic, circuitry, interfaces and/or code that may be operable to execute instructions for controlling/coordinating the overall operation of the headset 200. Such instructions may be part of an operating system or state machine of the headset 200 and/or part of one or more software applications running on the headset 200. In some implementations, the CPU 222 may be, for example, a programmable interrupt controller, a state machine, or the like.

The CPU 222 may also be operable to handle in-game visualization processing for the headset 200 based on, for example, analysis of game and/or chat audio received from the console 176 during game play. The CPU 222 may also be operable to handle in-game visualization processing for the headset 200 based on, for example, information in game and/or chat audio that is present specifically for the purpose of generating in-game visualization, rather than for the purpose of presentation to a listener. For example, information in the game and/or chat audio may indicate a game being played such that a corresponding visualization may be generated, a type of visualization to be generated (e.g., whether to display a map or a radar image), the content of the visualization (e.g., which characters and/or things to display on a map or radar image), how frequently the visualization should be updated, whether audio alerts should accompany the visualization, and/or the like. In this regard, the CPU 222 may be operable to dynamically handle processing of in-game visualizations for the headset 200 based on information that may be received from the audio processing circuit 230 and/or information that may be stored in the storage device 224 or an external storage device.

The storage device 224 may comprise suitable logic, circuitry, interfaces and/or code that may comprise, for example, FLASH or other nonvolatile memory, which may be operable to store data comprising operating data, configuration data, settings, and so on, which may be used by the CPU 222 and/or the audio processing circuit 230. Such data may include, for example, parameter settings that affect processing of audio signals in the headset 200 and parameter settings that affect functions performed by the user controls 212. For example, one or more parameter settings may determine, at least in part, a gain of one or more gain elements of the audio processing circuit 230. As another example, one or more parameter settings may determine, at least in part, a frequency response of one or more filters that operate on audio signals in the audio processing circuit 230. As another example, one or more parameter settings may determine, at least in part, whether and which sound effects are added to audio signals in the audio processing circuit 230 (e.g., which effects to add to microphone audio to morph the user's voice). Example parameter settings which affect audio processing are described in the co-pending U.S. patent application Ser. No. 13/040,144 titled "Game headset with Programmable Audio" and published as US2012/0014553, the entirety of which is hereby incorporated herein by reference. Particular parameter settings may be selected autonomously by the headset 200 in accordance with one or more algorithms, based on user input (e.g., via controls 212), and/or based on input received via one or more of the connectors 210 and 214.

The storage device 224 may also be operable to store audio information resulting from analysis of the plurality of audio channels of game and/or chat audio during game play. In one embodiment of the disclosure, the headset 200 may be operable to download the audio information for a particular game from a sounds database in an external storage device and store the downloaded audio information in the storage device 224. The external storage device may be located at a remote server (e.g., database 182 in FIG. 1C) or may be an external memory device, for example. In this regard, the CPU 222 may be operable to configure the radio 220 to download the audio information for the particular game. The audio information may comprise sounds and/or corresponding voice commands for the particular game, which may be utilized to provide in-game visualizations. Upon subsequent playback of that particular game, the headset 200 does not need to download the audio information for that particular game from the sounds database but may instead acquire the audio information for that particular game from the storage device 224. The CPU 222 may be operable to ensure that any updates to the sounds database may be downloaded from the sounds database and saved in the storage device 224 to ensure that the audio information and sounds for the particular game is kept up-to-date.

In another embodiment of the disclosure, the CPU 222 may be operable to configure the audio processing circuit 230 to perform signal analysis on the audio signals on one or more of the plurality of audio channels that are received via the connector 210 and/or the radio 220. The CPU 222 may be enabled to control the operation of the audio processing circuit 230 in order to store the results of the audio analysis along with, for example, an identifier of the game in the storage device 224. The CPU 222 may be enabled to monitor the plurality of audio channels that are received via the connector 210 and detect the characteristics of one or more sounds. Based on the detected sounds, the CPU 222 may be operable to generate a visual representation of the detected sounds and/or their corresponding characteristics (an "in-game visualization"). The CPU 222 may be operable to extract the one or more voice commands that correspond to the detected sounds from the internal storage device 504b.

In an exemplary embodiment of the disclosure, audio information for a particular game may be stored in a lookup table (LUT) in the storage device 224. In this regard, the LUT may comprise an identity of the game, audio information corresponding to a detected sound and a corresponding visual representation may be mapped to the detected sounds. In instances when a sound is detected on a monitored channel, the CPU 222 may compare the detected sound to that audio information that is stored in the storage device 224. If the comparison results in a match between the detected sound and the stored audio information, the corresponding visual representation may be determined from the LUT and output for display.

In an example implementation, the console 176 supports overlaying an in-game visualization on the screen on which the game itself is being played or on a second screen connected to the console. In such an implementation, the visual representation may be output to the console 176.

In an example implementation, the headset 200 may generate the video stream corresponding to the in-game visualization and output the video to the device 192 (i.e., treating the device 192 as a simple monitor).

In an example implementation, the headset 200 may work in concert with the device 192 to generate the in-game visualization. In such an implementation, for example, the headset 200 may send data resulting from analysis of game and/or chat audio to the device 192 (e.g., via an API of an in-game visualization app running on the device 192) and the device 192 may use that data to generate the video stream corresponding to the in-game visualization.

In some embodiments of the disclosure, the basestation 300 (FIG. 1B) may be operable to provide connectivity between the headset 200, the console 176 and the user interface devices 102, 103 which may comprise a game controller and the second screen communication device. In this regard, the basestation 300 may be operable to handle communication of the visual representation to the second screen communication device and/or to the console 176.

The memory 226 may comprise suitable logic, circuitry, interfaces and/or code that may comprise volatile memory used by the CPU 222 and/or audio processing circuit 230 as program memory, for storing runtime data, and so on. In this regard, the memory 226 may comprise information and/or data that may be utilized to control operation of the audio processing circuit 230 to perform signal analysis on the analysis of a plurality of received audio channels of game and/or chat audio in order to detect the characteristics of one or more sounds in the game and/or chat audio.

The audio processing circuit 230 may comprise suitable logic, circuitry, interfaces and/or code that may be operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 230 may be determined, at least in part, by which parameter settings have been selected. The processing performed by the audio processing circuit 230 may also be determined based on default settings, player preference, and/or by adaptive and/or dynamic changes to the game play environment. The processing may be performed on game, chat, and/or microphone audio that is subsequently output to speaker 216a and 216b. Additionally, or alternatively, the processing may be performed on chat audio that is subsequently output to the connector 210 and/or radio 220.

The audio processing circuit 230 may be operable to perform signal analysis on received audio signals that carry a plurality of audio channels. In this regard, the audio processing circuit 230 may be operable to analyze the audio on each of the plurality of received audio channels in order to detect the characteristics of sounds corresponding to the audio signals. In an exemplary embodiment of the disclosure, the audio processing circuit 230 may be operable to analyze the audio on each of the plurality of received audio channels in order to detect a unique signature that may be associated with a certain sound. In another exemplary embodiment of the disclosure, the audio processing circuit 230 may be operable to analyze the audio on each of the plurality of received audio channels in order to detect a unique signature that may be associated with a certain sound and to detect the intensity or loudness of that sound. In another exemplary embodiment of the disclosure, the audio processing circuit 230 may be operable to analyze the audio on each of the plurality of received audio channels in order to detect a unique signature that may be associated with a certain sound, the intensity or loudness of the sound, and the direction in which the detected sound may be moving. Based on the signal analysis by the audio processing circuit 230, the CPU 222 may determine how the detected sound and/or the corresponding characteristics are to be represented visually. In this regard, the CPU 222 may compare the detected sound and/or characteristics to that audio information that is stored in the storage device 224. If the comparison results in a match between the detected sound and the stored audio information, the CPU 222 may utilize the corresponding information to provide a visual representation of the detected sound.

In an exemplary embodiment of the disclosure, the audio processing circuit 230 may be operable to detect sounds in the game and/or chat audio whose purpose is to provide a visual representation of the detected sounds and/or the characteristics of the detected sounds (as opposed to sounds whose purpose is to be heard by a listener). In this regard, whenever the audio processing circuit 230 detects a particular such sound, the audio processing circuit 230 may notify the CPU 222 that the particular embedded sound has been detected. The CPU 222 may then determine the corresponding visual representation from the information stored in the LUT and cause display of the corresponding visualization on a screen. In some instances, the CPU 222 may communicate information representative of the visual representation to the console 176, and the console 176 which may, in turn, cause the visual representation to be communicated to a monitor. In some embodiments of the disclosure, the console 176 may cause the visual representation to be communicated to a monitor and overlaid on the game play. A sound having a specific purpose of providing a visual representation may be, for example, a tone or sequence of tones near an extreme of the audio band such that they are nearly, or entirely, imperceptible by the listener. The sounds may be part of the game's audio track (e.g., put there by the game makers/designers), inserted by the console 176 as it is processing the game and/or chat audio for output to the headset 200, inserted by a server hosting the multi-player chat, inserted by the headset of another player as it processes microphone audio for output to a corresponding console, and/or inserted by the console of another player as it is processing microphone audio for output to the chat server.

Figure 3A:
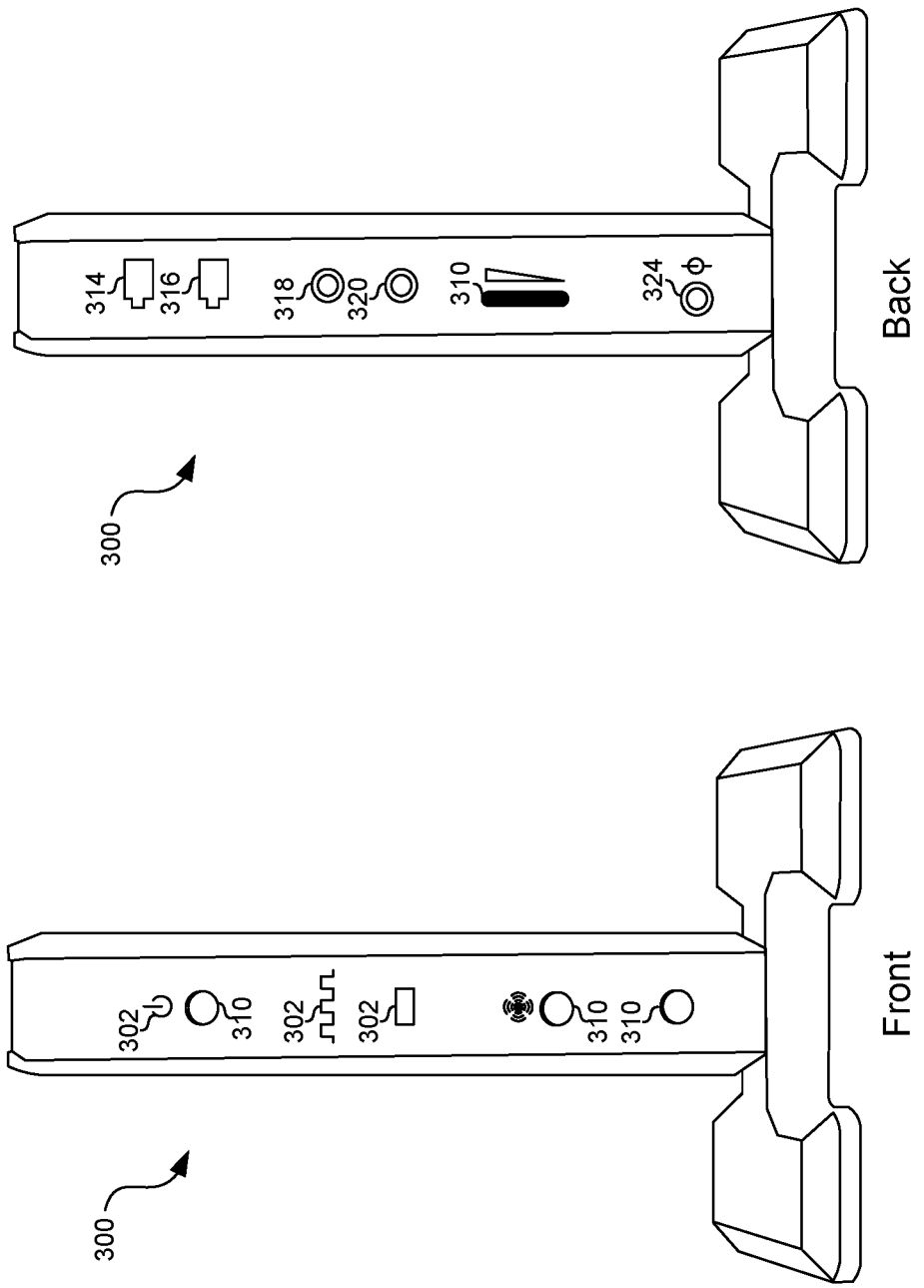
FIG. 3A is a diagram that depicts two views of an example embodiment of an audio basestation, in accordance with various exemplary embodiments of the disclosure.

FIG. 3A is a diagram that depicts two views of an example embodiment of an audio basestation, in accordance with various exemplary embodiments of the disclosure. Referring to FIG. 3A, there is shown an exemplary embodiment of an audio basestation 301. The basestation 301 comprises status indicators 302, user controls 310, power port 324, and audio connectors 314, 316, 318, and 320.

The audio connectors 314 and 316 may comprise digital audio in and digital audio out (e.g., S/PDIF) connectors, respectively. The audio connectors 318 and 320 may comprise a left "line in" and a right "line in" connector, respectively. The controls 310 may comprise, for example, a power button, a button for enabling/disabling virtual surround sound, a button for adjusting the perceived angles of the speakers when the virtual surround sound is enabled, and a dial for controlling a volume/gain of the audio received via the "line in" connectors 318 and 320. The status indicators 302 may indicate, for example, whether the audio basestation 301 is powered on, whether audio data is being received by the basestation 301 via connectors 314, and/or what type of audio data (e.g., Dolby Digital) is being received by the basestation 301.

Figure 3B:
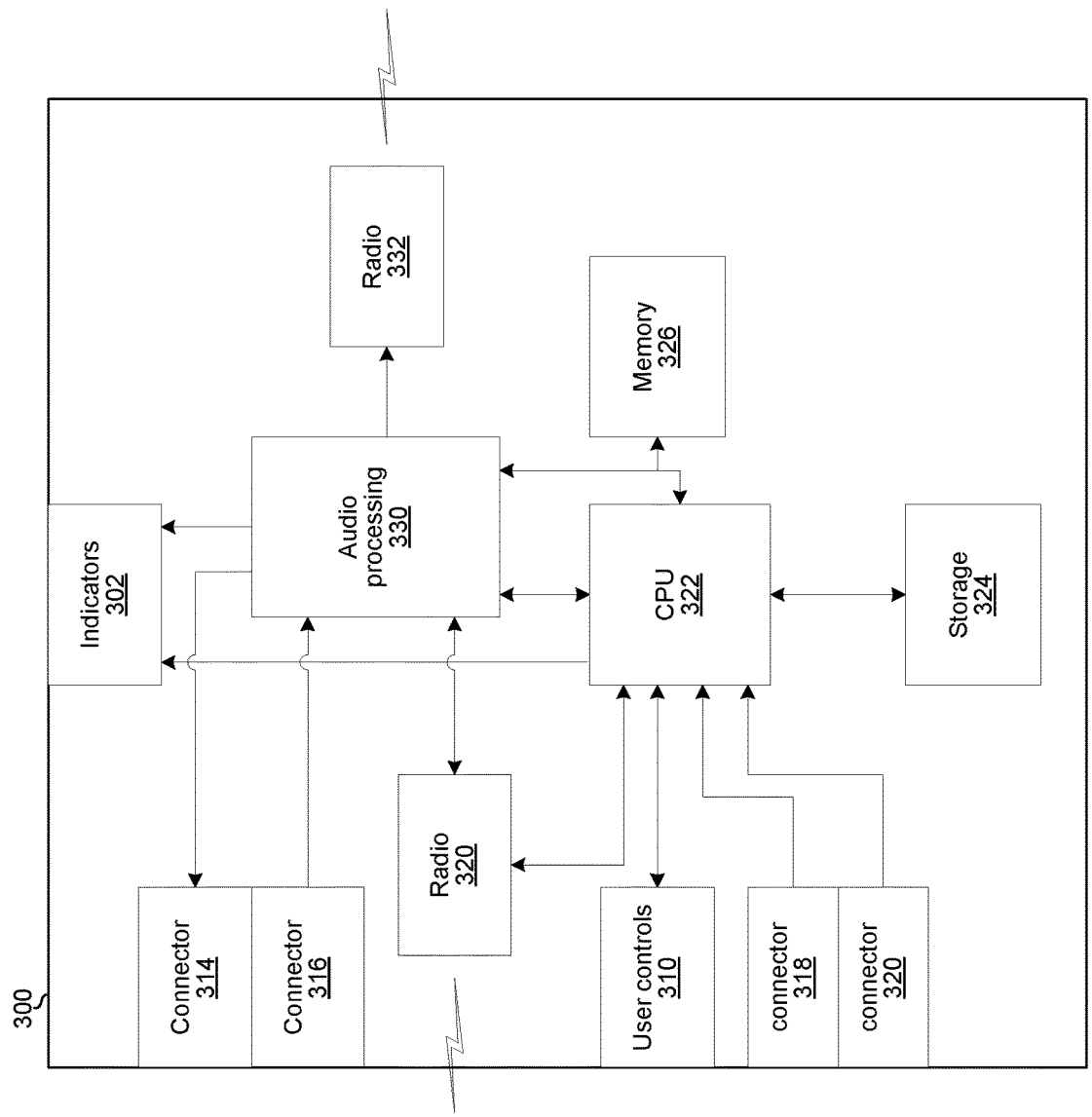
FIG. 3B is a diagram that depicts a block diagram of the audio basestation, in accordance with various exemplary embodiments of the disclosure.

FIG. 3B is a diagram that depicts a block diagram of the audio basestation 301, in accordance with various exemplary embodiments of the disclosure. Referring to FIG. 3B, there is shown an exemplary embodiment of an audio basestation 301. In addition to the user controls 310, indicators 302, and connectors 314, 316, 318, and 320 described above, the block diagram additionally shows a CPU 322, a storage device 324, a memory 326, a radio 320, an audio processing circuit 330, and a radio 332.

The radio 320 comprises suitable logic, circuitry, interfaces and/or code that may be operable to communicate in accordance with one or more standardized (such as the IEEE 802.11 family of standards, the Bluetooth family of standards, NFC, and/or the like) and/or proprietary (e.g., proprietary protocol for receiving audio protocols for receiving audio from a console such as the console 176) wireless protocols.

The radio 332 comprises suitable logic, circuitry, interfaces and/or code that may be operable to communicate in accordance with one or more standardized (such as, for example, the IEEE 802.11 family of standards, the Bluetooth family of standards, and/or the like) and/or proprietary wireless protocol(s) (e.g., a proprietary protocol for transmitting audio to the headphones 200).

The CPU 322 comprises suitable logic, circuitry, interfaces and/or code that may be operable to execute instructions for controlling/coordinating the overall operation of the audio basestation 301. Such instructions may be part of an operating system or state machine of the audio basestation 301 and/or part of one or more software applications running on the audio basestation 301. In some implementations, the CPU 322 may be, for example, a programmable interrupt controller, a state machine, or the like.

The storage 324 may comprise, for example, FLASH or other nonvolatile memory for storing data which may be used by the CPU 322 and/or the audio processing circuit 330. Such data may include, for example, parameter settings that affect processing of audio signals in the basestation 301. For example, one or more parameter settings may determine, at least in part, a gain of one or more gain elements of the audio processing circuit 330. As another example, one or more parameter settings may determine, at least in part, a frequency response of one or more filters that operate on audio signals in the audio processing circuit 330. As another example, one or more parameter settings may determine, at least in part, whether and which sound effects are added to audio signals in the audio processing circuit 330 (e.g., which effects to add to microphone audio to morph the user's voice). Example parameter settings which affect audio processing are described in the co-pending U.S. patent application Ser. No. 13/040,144 titled "Game headset with Programmable Audio" and published as US2012/0014553, the entirety of which is hereby incorporated herein by reference. Particular parameter settings may be selected autonomously by the basestation 301 in accordance with one or more algorithms, based on user input (e.g., via controls 310), and/or based on input received via one or more of the connectors 314, 316, 318, and 320.

The memory 326 may comprise volatile memory used by the CPU 322 and/or audio processing circuit 330 as program memory, for storing runtime data, etc.

The audio processing circuit 330 may comprise suitable logic, circuitry, interfaces and/or code that may be operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 330 may be determined, at least in part, by which parameter settings have been selected. The processing may be performed on game and/or chat audio signals that are subsequently output to a device (e.g., headset 200) in communication with the basestation 301. Additionally, or alternatively, the processing may be performed on a microphone audio signal that is subsequently output to a device (e.g., console 176) in communication with the basestation 301.

Figure 4:
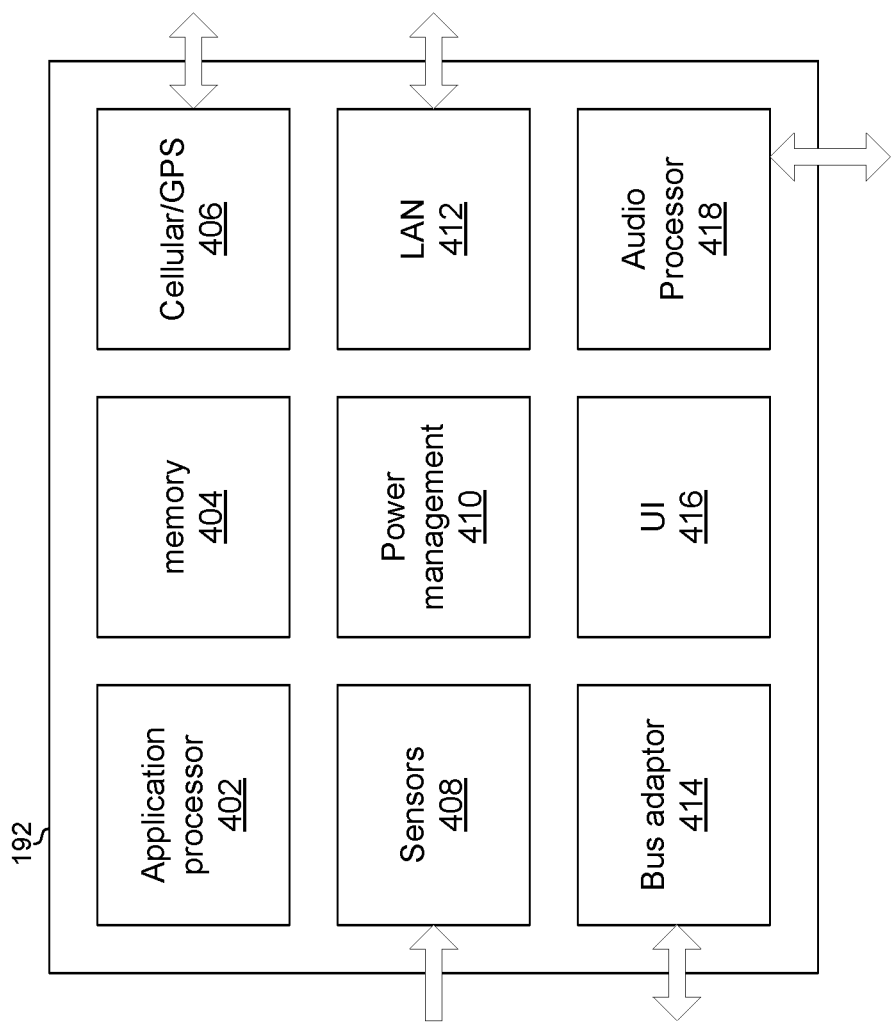
FIG. 4 is a block diagram of an exemplary multi-purpose device, in accordance with various exemplary embodiments of the disclosure.

FIG. 4 is a block diagram of an exemplary multi-purpose device 192, in accordance with various exemplary embodiments of the disclosure. The example multi-purpose device 192 comprises an application processor 402, memory subsystem 404, a cellular/GPS networking subsystem 406, sensors 408, power management subsystem 410, LAN subsystem 412, bus adaptor 414, user interface subsystem 416, and audio processor 418.

The application processor 402 comprises suitable logic, circuitry, interfaces and/or code that may be operable to execute instructions for controlling/coordinating the overall operation of the multi-purpose device 192 as well as graphics processing functions of the multi-purpose device 192. Such instructions may be part of an operating system of the console and/or part of one or more software applications running on the console.

The memory subsystem 404 comprises volatile memory for storing runtime data, nonvolatile memory for mass storage and long-term storage, and/or a memory controller which controls reads/writes to memory.

The cellular/GPS networking subsystem 406 comprises suitable logic, circuitry, interfaces and/or code that may be operable to perform baseband processing and analog/RF processing for transmission and reception of cellular and GPS signals.

The sensors 408 comprise, for example, a camera, a gyroscope, an accelerometer, a biometric sensor, and/or the like.

The power management subsystem 410 comprises suitable logic, circuitry, interfaces and/or code that may be operable to manage distribution of power among the various components of the multi-purpose device 192.

The LAN subsystem 412 comprises suitable logic, circuitry, interfaces and/or code that may be operable to perform baseband processing and analog/RF processing for transmission and reception of cellular and GPS signals.

The bus adaptor 414 comprises suitable logic, circuitry, interfaces and/or code that may be operable for interfacing one or more internal data busses of the multi-purpose device with an external bus (e.g., a Universal Serial Bus) for transferring data to/from the multi-purpose device via a wired connection.

The user interface subsystem 416 comprises suitable logic, circuitry, interfaces and/or code that may be operable to control and relay signals to/from a touchscreen, hard buttons, and/or other input devices of the multi-purpose device 192.

The audio processor 418 comprises suitable logic, circuitry, interfaces and/or code that may be operable to process (e.g., digital-to-analog conversion, analog-to-digital conversion, compression, decompression, encryption, decryption, resampling, etc.) audio signals. The audio processor 418 may be operable to receive and/or output signals via a connector such as a 3.5 mm stereo and microphone connector.

Figure 5:
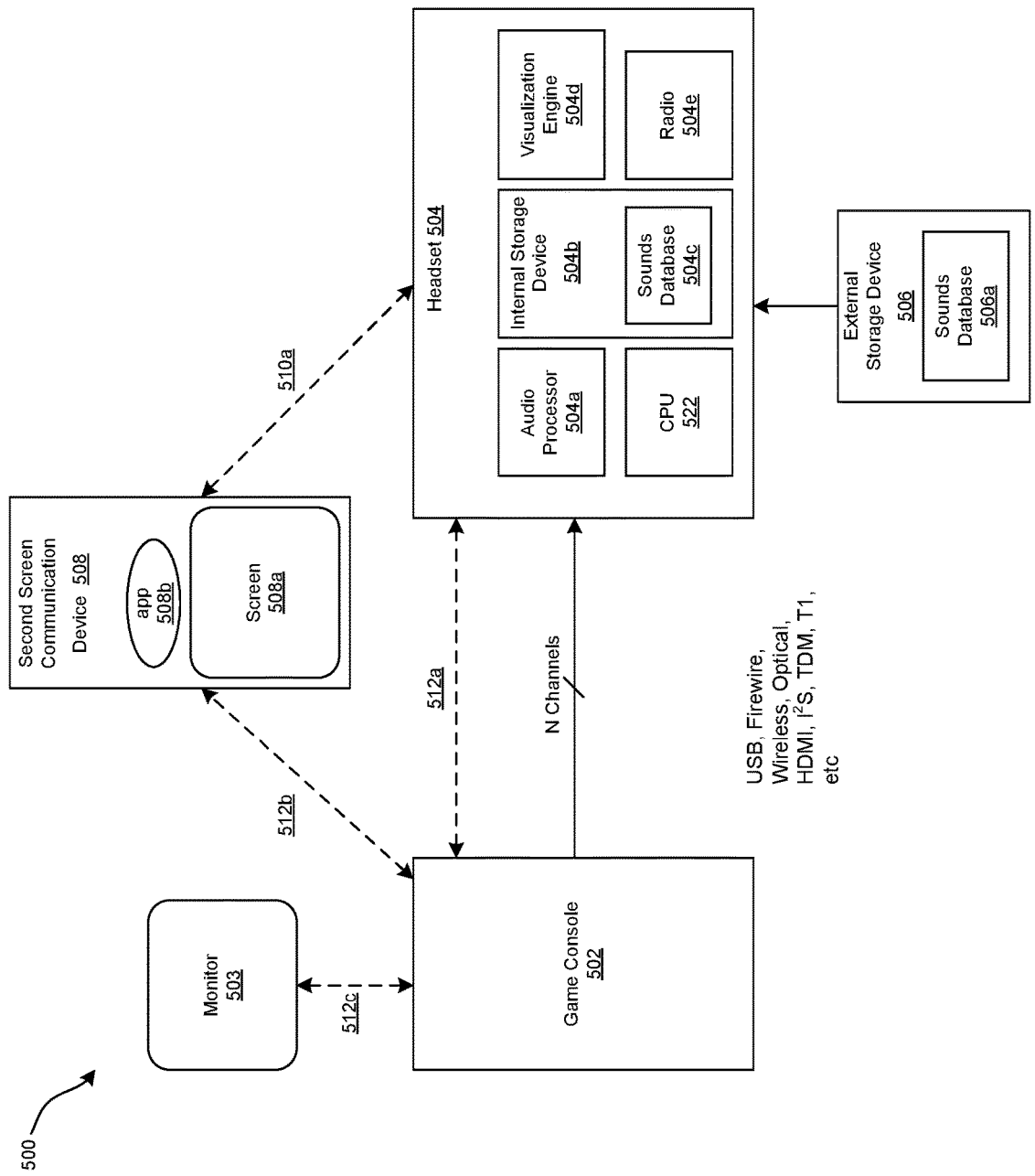
FIG. 5 is a block diagram illustrating an exemplary subsystem that may be utilized for providing audio alerts based on sounds detected during game play, in accordance with an embodiment of the disclosure

FIG. 5 is a block diagram illustrating an exemplary subsystem that may be utilized for providing audio alerts based on sounds detected during game play, in accordance with an embodiment of the disclosure. Referring to FIG. 5, there is shown a game console 502, a monitor 503, a headset 504, an external storage device 506, and a second screen communication device 508. The headset 504 may comprise an audio processor 504a, an internal storage device 504b, a visualization engine 504d, a radio 504e and a CPU 522. The internal storage device 504b may comprise a sounds database 504c. The external storage device 506 may comprise a sounds database 506a. The second screen communication device 508 may comprise a screen 508a and an application 508b.

The game console 502 may comprise suitable logic, circuitry, interfaces and/or code that may be operable to present a game to, and also enable game play interaction between, one or more local players and/or one or more remote players. The game console 502 may be substantially similar to the game console 176, which is shown and described with respect to FIG. 1A. The game console 502 may be operable to generate output video signals for a game over a video channel and output corresponding audio signals for the game over one or more of a plurality of audio channels. Exemplary audio channels may comprise a center (CTR) channel, a front right (FR) channel, a front left (FL) channel, a rear right (RR) channel, a rear left (RL) channel, a side right (SR) channel, and a side left (SL) channel. The audio and video generated from the game console 502 during game play may be communicated to the monitor 503 to be displayed by the monitor 503. In some embodiments of the disclosure, the video output by the game console 502 may include an in-game visualization overlaid on the game video. In some embodiments of the disclosure, the portion of the video corresponding to the overlaid in-game visualization may have been received from the headset 504. In some embodiments of the disclosure, the console 502 may generate video for the in-game visualization, and communicate the video to the second screen communication device 508. In some embodiments of the disclosure, the basestation 300 (FIG. 1B) may be operable to provide connectivity between the headset 504, the game console 502 and the second screen communication device 508. In this regard, the basestation 300 may be operable to handle communication of the visual information to the second screen communication device and/or to the console 176.

The monitor 503 may comprise suitable logic, circuitry, interfaces and/or code that may be operable to display corresponding audio and video that may be received from the game console 502 for the game during game play. The monitor 503 may comprise a television (TV), computer monitor, laptop display, and so on.

The headset 504 may comprise suitable logic, circuitry, interfaces and/or code that may be operable to receive the plurality of audio channels of game and/or chat audio. The headset 504 may be substantially similar to the headset 200, which is shown and described with respect to FIGS. 2A, 2B and 2C. The headset 504 may be operable to monitor and analyze the plurality of audio channels in order to detect characteristics of the sounds on the monitored audio channels and provide in-game visualization based on the analysis of the audio signals.

The external storage device 506 may comprise one or more suitable devices having suitable logic, circuitry, interfaces and/or code that may be operable to store audio information for a game. The audio information may be stored in, for example, the sounds database 506a. The audio information may be utilized to provide in-game visualization based on the analysis of the game and/or chat audio. The stored audio information in the sounds database 506a may be transferred from the external storage device 506 to the sounds database 504c in the internal storage device 504b.

The audio processor 504a may comprise suitable logic, circuitry, interfaces and/or code that may be operable to monitor the plurality of audio channels of the game and/or chat audio. The audio processor 504a may be substantially similar to the audio processing circuit 230, which is shown and described with respect to FIG. 1A. The audio processor 504a may be operable to utilize signal analysis to detect the characteristics of sounds in the monitored plurality of audio channels. In instances when the audio processor 504a detects certain sounds, the audio processor 504a may be operable to cause the visualization engine 504d to (1) display a visual representation of the detected sounds and/or their corresponding characteristics on the second screen communication device 508, and/or (2) cause information representative of visual representation of the detected sounds to communicated from the headset 504 to the game console 502 and/or the device 508 for display.

The internal storage device 504b may comprise one or more suitable devices that may comprise suitable logic, circuitry, interfaces and/or code that may be operable to store audio information for a game. The internal storage device 504b may be substantially similar to the storage device 224, which is shown and described with respect to FIG. 2C. The audio information may be stored in, for example, the sounds database 504c. Audio information for a particular game may be downloaded from the sounds database 506a, which is in the external storage device 506, by the headset 504 via, for example, a wireless connection. The downloaded audio information may be stored in the sounds database 504c, which is in the internal storage device 504b. Audio information may be retrieved from the internal storage device 504b when a game is initiated.

The CPU 522 may comprise suitable logic, circuitry, interfaces and/or code that may be operable to execute instructions for controlling, managing and/or coordinating the overall operation of the headset 504. In this regard, the CPU 522 may be operable to control, manage and coordinate operation of the components in the headset 504, which comprises the audio processor 504a, the internal storage device 504b, the visualization engine 504d, the radio 504e and the sounds database 504c. The CPU 522 may also be operable to coordinate and manage operations between the headset 504, the game console 502, and the external storage device 506. The CPU 522 may also be operable to coordinate and manage operations for the sounds database 504c and the sounds database 506a. The CPU 522 may be substantially similar to the CPU 222, which is shown and described with respect to, for example, FIG. 2C.

The visualization engine 504d may comprise suitable logic, circuitry, interfaces and/or code that may be operable to determine what type of visualization information corresponding to a particular sound, which is detected within the monitored channels by the audio processor 504a, should be utilized for an in-game visualization. The CPU 522 and/or the visualization engine 504d may be operable to compare the results of the signal analysis by the audio processor 504a with audio and visualization information stored in the sounds database 504c in order to determine the visualizations (i.e., images, graphics, video clips, and/or the like) that are to be utilized for the particular sound. In accordance with an embodiment of the disclosure, the CPU 522 and/or the visualization engine 504d may be operable to utilize the determined characteristics of the detected sound to extract the visualization information from the sounds database 504c, which specifies the visualization that is to be utilized for the particular sound.

In an exemplary embodiment of the disclosure, in instances when the audio processor 504a detects sounds whose characteristics indicate that the audio is increasing in the SR channel and/or RR channel, the visualization engine 504d may be operable to generate a visual representation of sounds approaching the player's character from both the left and the right directions. When the audio that is increasing in the SR channel and/or RR channel is initially detected, it may be represented visually with a first color. As the audio continues to increase, in the SR channel and/or RR channel, the location and/or color of the visual representation may change to attract attention. As the characteristics of the detected sound continue to change based on the results of the audio analysis, the CPU 522 and/or the visualization engine 504d may be operable to dynamically and/or adaptively update the visual representation of the detected sound. In some exemplary embodiments of the disclosure, the visual representation may change from a static visual representation to an animated visual representation. For example, the visual representation may start flashing, get bigger, get brighter, have a different color, have a different shape, and/or start moving if it was previously static. Additionally, an audio command or an audio prompt may also be provided that notifies the listener by stating "Look to the right!". In this regard, the audio processor 504a and/or the CPU 522 may be operable to generate the audio command or audio prompt.

In another exemplary embodiment of the disclosure, in instances when the audio processor 504a detects sounds whose characteristics indicate that the audio is increasing in both the RR channel and the RL channel, the visualization engine 504d may be operable to generate a visual representation of sounds approaching the player's character from the rear of the listener. When the audio that is increasing in the SR channel and/or RR channel is initially detected, it may be represented visually with a first color. As the audio continues to increase in both the RR channel and the RL channel, the location and/or color of the visual representation may change to attract attention. As the characteristics of the detected sound continues to change based in the results of the audio analysis, the CPU 522 and/or the visualization engine 504d may be operable to dynamically and/or adaptively update the visual representation of the detected sound. In some exemplary embodiments of the disclosure, the visual representation may change from a static visual representation to an animated visual representation. For example, the visual representation may start flashing, get bigger, get brighter, have a different color, have a different shape, and/or start moving if it was previously static. Additionally, an audio command or an audio prompt may also be provided that notifies the listener by stating "He's behind you!". In this regard, the audio processor 504a and/or the CPU 522 may be operable to generate the audio command or audio prompt.

In some embodiments of the disclosure, the CPU 522 may be operable to cause the visualization engine 504d to provide a particular visualization in instances when the audio processor 504a detects an embedded sound on a monitored channel. The particular visualization may occur in response to detection of particular sounds that may be part of the audio track and is intended to be heard by the listener. In an exemplary embodiment of the disclosure, in instances when the audio processor 504a is monitoring the plurality of audio channels and detects a particular sound corresponding to a red-lining engine during game play, the CPU 522 and/or the visualization engine 504d may be operable to cause generation of a pop-up or other textual representation that notifies the listener by stating "Shift!," as well as providing an audio command or audio prompt that states "Shift!".

The radio 504e may comprise suitable logic, circuitry interfaces and/or code that may be operable to communicate signals between the headset 504 and the game console 502 and/or between the headset 504 and the second screen communication device 508. The radio 504e may be substantially similar to the radio 220, which is described with respect to and shown in FIG. 2C. In accordance with an embodiment of the disclosure, the headset 504 may be operable to utilize the radio 504e to communicate visualization information from the visualization engine 504d to the second screen communication device 508 via the communication link 510a and/or to the game console 502 via the communication link 512a. The second screen communication device 508 may be operable to present the visualization of the detected sounds based on the visualization information received from the headset 504. The game console 502 may be operable to cause the visualization of the detected sounds to be presented on the second screen communication device 508 and/or on the monitor 503 based on the received visualization information.

The second screen communication device 508 may comprise suitable logic, circuitry interfaces and/or code that may be operable to provide a visual representation of one or more sounds that are detected by the audio processor 504a. In this regard, the second screen communication device 508 may be operable to communicate with the headset 504 via the communication link 510a in order to receive visualization information to present the visualization of the detected sounds. The second screen communication device 508 may be substantially similar to device 192, for example, and may comprise a smartphone, a tablet, a monitor, or the like.

The application (app) 508b may comprise suitable logic, interfaces and/or code that may enable the second screen communication device 508 to receive visualization information from the headset 504. In an exemplary embodiment of the disclosure, the visualization engine 504d may be operable to communicate with the app 508b, which is running on the second screen communication device 508 in order to acquire visualization information for sounds that are detected by the audio processor 504a during game play. The app 508b may be operable to receive the visualization information from the visualization engine 504d and cause the corresponding visualization of the detected sounds to be rendered on the screen 508a. The app 508b may be operable to dynamically receive updated information for detected sounds from the visualization engine 504d and accordingly update the corresponding visualization on the screen 508a.

In operation, the audio processing circuit 504a may be operable to monitor the audio signals that are received via the plurality of received audio channels from the game console 502. In this regard, the audio processor 504a may be operable to perform signal analysis of the audio signals on each of the plurality of received audio channels to detect characteristics of sounds corresponding to the audio signals. Based on the signal analysis by the audio processing circuit 504a, the CPU 522 may be operable to detect sounds on one or more of the plurality of received audio channels carrying game and/or chat audio. The visualization engine 504*d* may be operable to determine the visualization that is to be provided for the detected sound based on information in the sounds database 504*c*. The visualization engine 504*d* may be operable to communicate visualization information to the app 508*b* in the second screen communication device 508. The app 508*b* may be operable to cause the corresponding visualization of the detected sounds to be rendered on the screen 508*a*. The headset 504 may also operable to communicate visualization information from the visualization engine 504*d* to the game console 502. The game console 502 may be operable to cause visualization of the detected sounds on the monitor 503 via the communication link 512*c* and/or the second screen communication device 508 via the communication link 512*b*.

Figure 6:
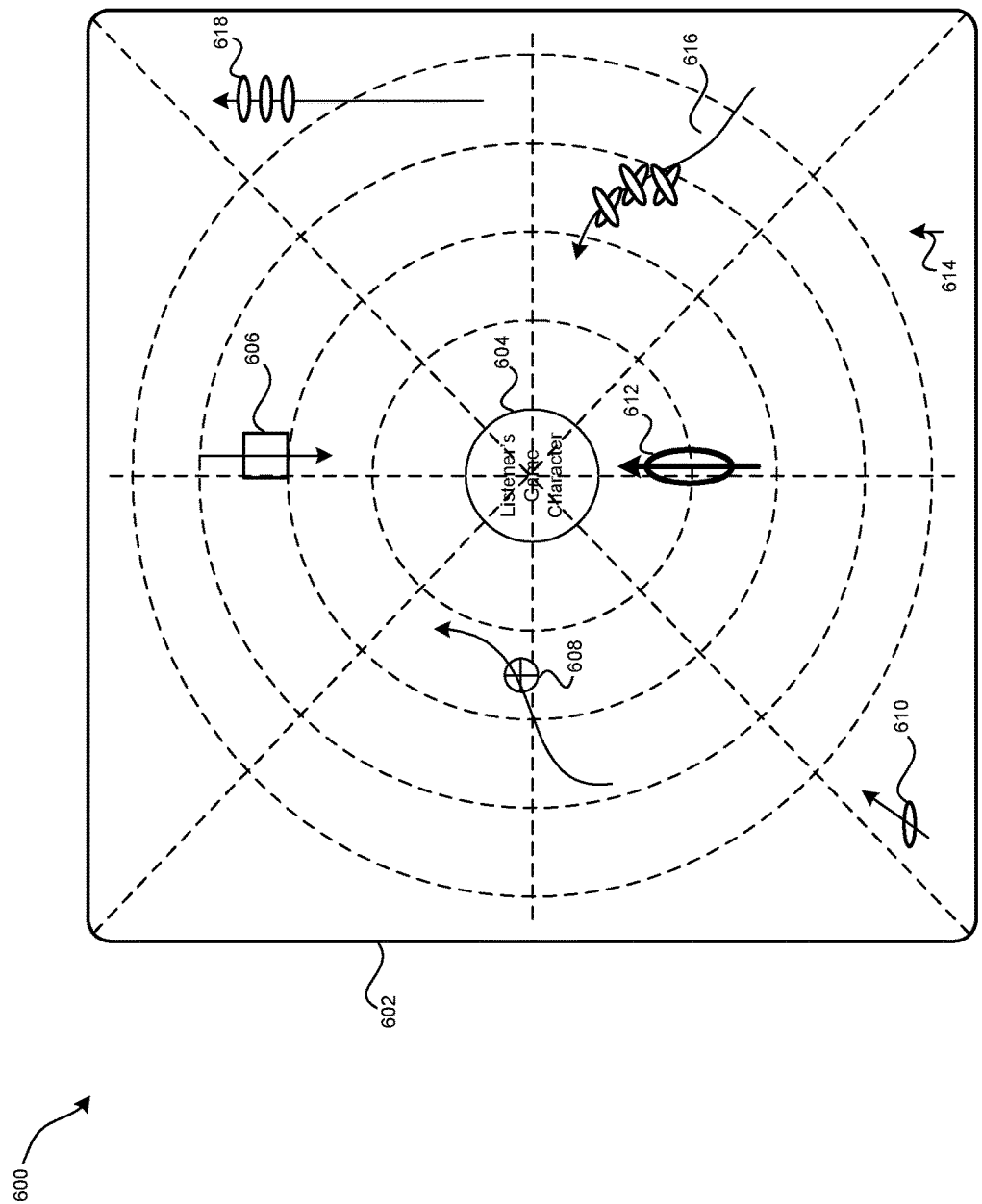
FIG. 6 is a diagram illustrating an exemplary display of visual representations of sounds detected in game and/or chat audio, in accordance with various exemplary embodiments of the disclosure.

FIG. 6 is a diagram illustrating an exemplary display of visual representations of sounds detected in game and/or chat audio, in accordance with an exemplary embodiment of the disclosure. Referring to FIG. 6, there is shown an exemplary visualization 600 for sounds that may be detected during game play and displayed on a display or screen 602. The visualization 600 may comprise a plurality of visualization elements 606 to 618.

The headset 504 may monitor sound levels on each received audio channel (e.g., CTR, FR, SR, RR, RL, SL, FL) and generate the visualization 600 based on analysis of the characteristics of the sounds that are detected in the various channels. The display or screen 602 may represent relative amplitudes of sounds coming from the various directions. For example, the visual representation may be an arrow pointing in the direction of the loudest sound. The display or screen 602 may indicate position of multiple sound sources. For example, the player's game character 604 may be located at the center of a simulated radar screen and markers (e.g., graphics, images, etc.) corresponding to sound sources may be placed around the simulated radar screen at positions determined from the audio analysis. The different sound sources may be identified based on their unique sound signature or other characteristics and may be represented differently on the visualization 600. For example, a first type of car having first sounding engine may be displayed in red while other cars with different engine sounds may be a different color. The visualization 600 may be overlaid on the primary screen on which the game is being played and/or may be presented on a second screen such as a smartphone, a tablet and so on.

The app 508*b* may be operable to display or overlay a grid, for example, a simulated radar grid, that may give the listener of the headset 504 a relative location of the detected sounds with respect to a location of the listeners game character 604 and/or the characteristics of the detected sounds. The listener's game character 604 is shown at the center of the radar. Although a 2D visualization is shown, the disclosure is not limited in this regards. Accordingly, in some embodiments of the disclosure, the visualization 600 may comprise a 3D visualization.

The marker 606 shows the detected sound of an approaching object. The object is approaching the listener's game character 604 from the front and has been moving in the same direction towards the listener's game character 604 for some time as indicated by the arrow and the length of the arrow. As the object gets closer to the listener's game character 604, the size and/or color of the object's marker may change and get more prominent. The length, direction, color and/or shape of the arrow may serve as an indication of the one or more of the characteristics of the detected sounds of the approaching object.

The marker 608 shows the detected sound of an approaching object. The object is approaching the listener's game character 604 from the left and has been moving in various directions left of the listener's game character 604 for some time as indicated by the arrow and the length of the arrow. The object is not getting closer to the listener's game character 604 and instead, is currently moving away from the listener's game character 604. The length, direction, color and/or shape of the arrow may serve as an indication of the one or more of the characteristics of the detected sounds of the approaching object.

The marker 610 shows the detected sound of an approaching opponent's footstep. The footsteps are approaching the listener's game character 604 from the left and has been moving in the same direction left of the listener's game character 604 for a relatively short period of time as indicated by the arrow and the length of the arrow. The footsteps are getting closer to the listener's game character 604. The length, direction, color and/or shape of the arrow may serve and an indication of the one or more of the characteristics of the detected sounds of the approaching enemy's opponent's footsteps. As the number of detected footsteps increase, the size of the marker 610 may also increase.

The marker 612 shows the detected sound of an approaching helicopter. The helicopter is approaching the listener's game character 604 from the back and has been moving in the same direction towards the listener's game character 604 for some time as indicated by the arrow and the length of the arrow. As the helicopter gets closer to the listener's game character 604, the size and/or color of the helicopter may change and get more prominent as the helicopter gets closer to the listener's game character 604. The length, direction, color and/or shape of the arrow may serve and an indication of the one or more of the characteristics of the detected sounds of the approaching enemy's or opponent's helicopter. The marker 612 has increased in size and the color has changed to show that it is close to the listener's game character 604.

The marker 614 shows the detected sound of an entity that is currently unknown. The unknown entity has just been detected and additional information is needed to provide further visualization. The unknown entity appears to be currently moving in the general direction of the listener's game character 604 but not directly towards the listener's game character 604.

The marker 616 shows the detected sound of an approaching aircraft. The aircraft is approaching the listener's game character 604 from the right and has been moving in various directions right of the listener's game character 604 for some time as indicated by the arrow and the length of the arrow. The aircraft is getting closer and closer to the listener's game character 604. The length, direction, color and/or shape of the arrow may serve as an indication of the one or more of the characteristics of the detected sounds of the aircraft. Several approaching aircrafts have been detected.

The marker 618 shows the detected sound of an opponent's footstep. The footsteps have moved away from the listener's game character 604 and have maintained the same direction to the right of the listener's game character 604 for a long period of time as indicated by the arrow and the length of the arrow. The length, direction, color and/or shape of the arrow may serve and an indication of the one or more of the characteristics of the detected sounds of the approaching enemy's or opponent's footsteps. As the number of detected footsteps increase, the size of the marker 618 may also increase. Multiple footsteps were detected.

Figure 7:
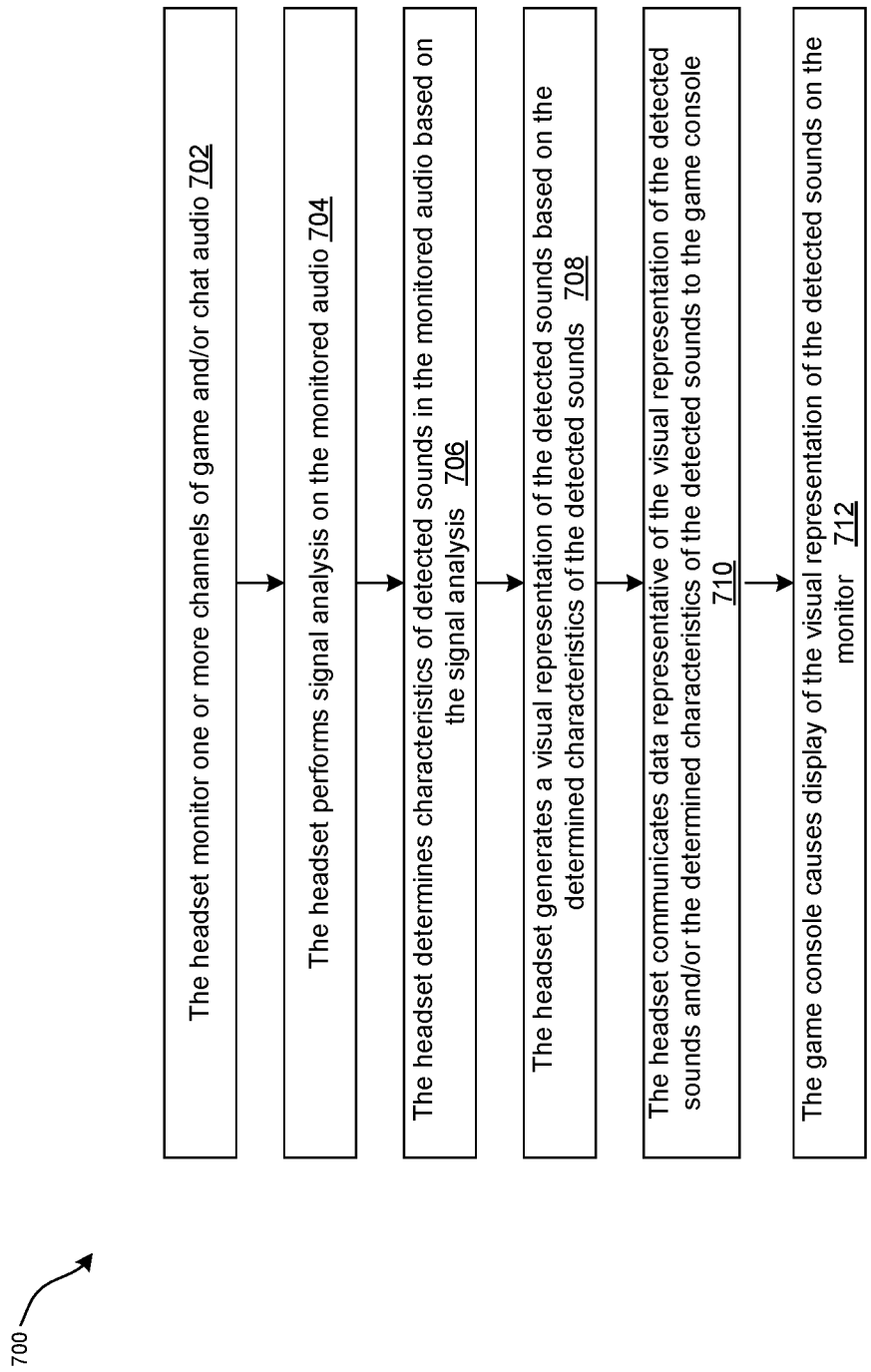
FIG. 7 is a flow diagram illustrating exemplary steps for in-game visualization based on audio analysis, in accordance with various exemplary embodiments of the disclosure.

FIG. 7 is a flow diagram illustrating exemplary steps for in-game visualization based on audio analysis, in accordance with various exemplary embodiments of the disclosure. Referring to FIG. 7, there is shown a flow chart 700 comprising a plurality of exemplary steps, namely, 702 through 712. In step 702, the headset may be operable to monitor one or more channels of game and/or chat audio. In step 704, the headset may be operable to perform signal analysis on the monitored audio. In step 706, the headset may be operable to determine characteristics of detected sounds in the monitored audio based on the signal analysis. In step 708, the headset generates a visual representation of the detected sounds based on the determined characteristics of the detected sounds. In step 710, the headset communicates data representative of the visual representation of the detected sounds and/or the determined characteristics of the detected sounds to the game console. In step 712, the game console causes display of the visual representation of the detected sounds on the monitor.

Figure 8:
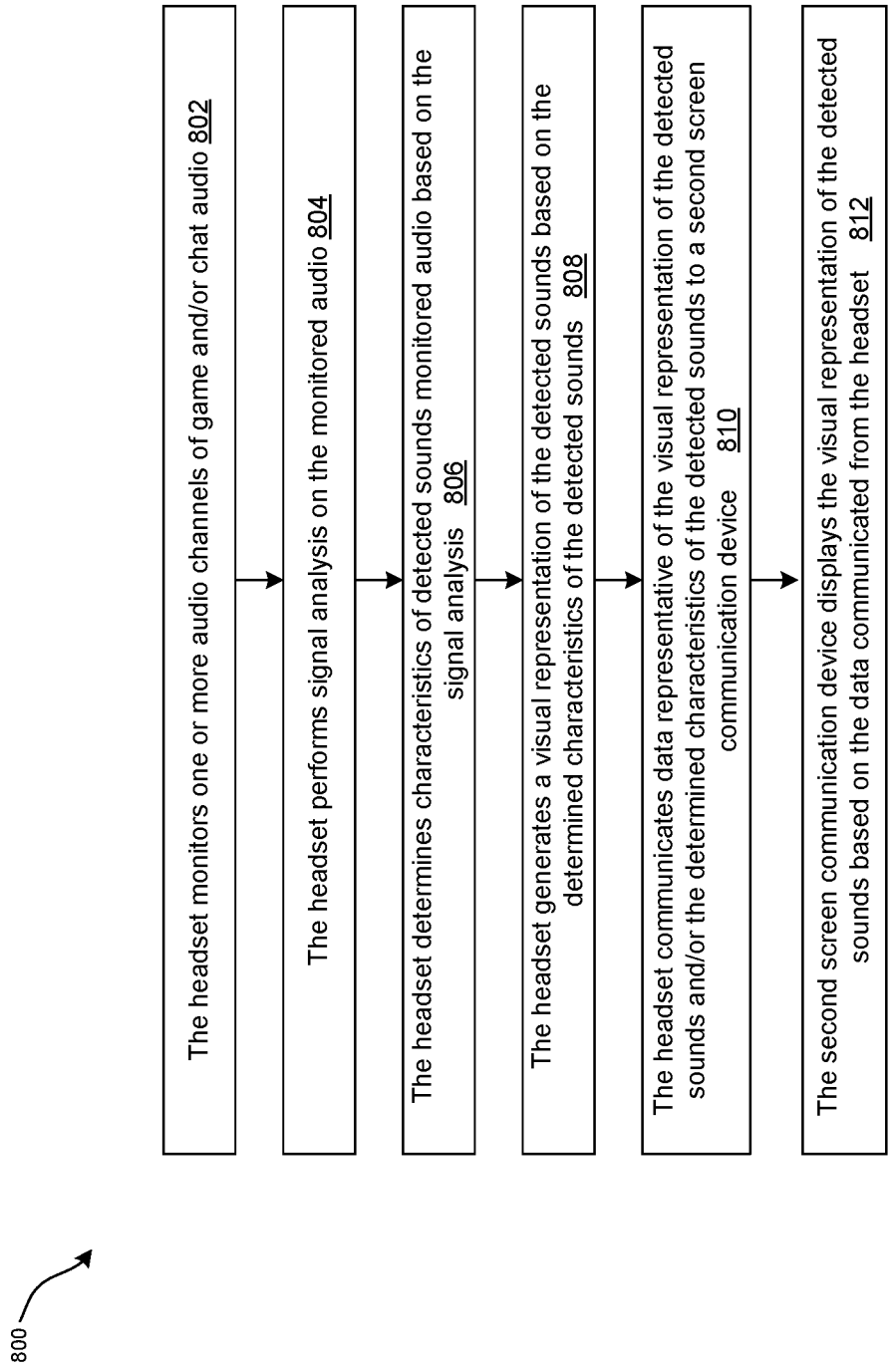
FIG. 8 is a flow diagram illustrating exemplary steps for in-game visualization based on audio analysis, in accordance with various exemplary embodiments of the disclosure.

FIG. 8 is a flow diagram illustrating exemplary steps for in-game visualization based on audio analysis, in accordance with various exemplary embodiments of the disclosure. Referring to FIG. 8, there is shown a flow chart 800 comprising a plurality of exemplary steps, namely, 802 through 812. In step 802, the headset may be operable to monitor one or more channels of game and/or chat audio. In step 804, the headset may be operable to perform signal analysis on the monitored audio. In step 806, the headset may be operable to determine characteristics of detected sounds in the monitored audio based on the signal analysis. In step 808, the headset generates a visual representation of the detected sounds based on the determined characteristics of the detected sounds. In step 810, the headset communicates data representative of the visual representation of the detected sounds and/or the determined characteristics of the detected sounds to a second screen communication device. In step 812, the second screen communication device displays the visual representation of the detected sounds based on the data communicated from the headset.

In accordance with an exemplary embodiment of the disclosure, a game headset such as the headset 504 may be operable receive a plurality of channels of game and/or chat audio during game play. The game headset 504 may be operable to monitor the plurality of channels, and detect one or more sounds on the channels during the monitoring. The game headset 504 may be operable to determine characteristics of the detected one or more sound and outputs one or more signals for generating a visual representation of the detected one or more sounds based on the determined characteristics. The game headset 504 may be operable to output the signals to a game console that provides the game play. The game console 502 displays the visual representation during the game play based on the communicated visualization information. The one or more signals may comprise a video stream of an in-game visualization. The game headset 504 may be operable to output the one or more signals to a second screen communication device 508 that generates the visual representation during the game play based on the signals.

For the determining of the characteristics of the detected one or more sounds, the game headset 504 may be operable to determine one or more of: changes in which of the plurality of channels are carrying the detected one or more sounds, changes in intensity or loudness of the detected one or more sound, and changes in frequency of occurrence of the detected one or more sounds. The characteristics comprises one or more of: intensity or loudness of the detected one or more sounds, which of the plurality of channels are carrying the detected one or more sounds, and frequency of occurrence of the detected one or more sounds. The game headset 504 may be operable to perform signal analysis on the plurality of channels of game and/or chat audio during the game play in order to determine the characteristics of the one or more sounds. The visual representation of the detected one or more sounds comprises a graphical representation of a location of the detected one or more sounds, and a graphical representation of one or more of the determined characteristics of the detected one or more sounds. The graphical representation of one or more of the determined characteristics of the detected one or more sounds comprises one or more of: a static representation, an animated representation and a dynamic representation.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Throughout this disclosure, the use of the terms dynamically and/or adaptively with respect to an operation means that, for example, parameters for, configurations for and/or execution of the operation may be configured or reconfigured during run-time (e.g., in, or near, real-time) based on newly received or updated information or data. For example, an operation within a transmitter and/or a receiver may be configured or reconfigured based on, for example, current, recently received and/or updated signals, information and/or data.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method comprising:
   receiving, by audio processing circuitry of a headset via a wired or wireless link to a gaming device, game audio of a game being played on the gaming device;
   processing, by the audio processing circuitry, the game audio to detect a plurality of sound sources;
   generating, by visualization circuitry of the headset, a video signal that conveys a visual representation of the detected plurality of sound sources and a direction in which each of said plurality of sound sources is moving; and
   communicating the visual representation to a display coupled to the gaming device.

2. The method of claim 1, comprising transmitting, by a transmitter of the headset, the video signal to a peripheral device.

3. The method of claim 1, comprising transmitting, by a transmitter of the headset, the video signal to the gaming device.

4. The method of claim 1, wherein the headset comprises one or more speakers and a microphone.

5. The method of claim 1, wherein the processing of the game audio comprises accessing a gaming sounds database that stores audio signatures.

6. The method of claim 1, wherein the visual representation comprises a plurality of markers corresponding to the plurality of sound sources.

7. The method of claim 6, wherein the plurality of markers conveys relative positions of the plurality of sound sources.

8. The method of claim 6, wherein the plurality of markers conveys speed and/or direction of movement of the sound sources.

9. The method of claim 6 comprising determining, by the audio processing circuitry during the processing of the game audio, which one or more of a plurality of audio channels are carrying sounds from each of the detected plurality of sound sources.

10. The method of claim 9, wherein the visual representation comprises a plurality of markers corresponding to the plurality of sound sources.

11. A system comprising:
    a headset comprising:
    audio processing circuitry operable to:
    receive, via a wired or wireless link to a gaming device, game audio of a game being played on the gaming device;
    process the game audio to detect a plurality of sound sources; and
    visualization circuitry operable to generate a video signal that conveys a visual representation of the detected plurality of sound sources and a direction in which each of said plurality of sound sources is moving; and
    a transmitter operable to communicate the visual representation to a display coupled to the gaming device.

12. The system of claim 11, wherein the transmitter is operable to transmit the video signal to a peripheral device.

13. The system of claim 11, wherein the transmitter is operable to transmit the video signal to the gaming device.

14. The system of claim 11, wherein the headset comprises one or more speakers and a microphone.

15. The system of claim 11, wherein, as part of the processing of the game audio, the audio processing circuitry is operable to access a gaming sounds database that stores audio signatures.

16. The system of claim 11, wherein the visual representation comprises a plurality of markers corresponding to the plurality of sound sources.

17. The system of claim 16, wherein the plurality of markers conveys relative positions of the plurality of sound sources.

18. The system of claim 16, wherein the plurality of markers conveys speed and/or direction of movement of the sound sources.

19. The system of claim 16 wherein the audio processing circuitry is operable to, during the processing of the game audio, determine which one or more of a plurality of audio channels are carrying sounds from each of the detected plurality of sound sources.

20. The system of claim 19, wherein the visual representation comprises a plurality of markers corresponding to the plurality of sound sources.

* * * * *